US010554067B2

(12) United States Patent
Zhang et al.

(10) Patent No.: US 10,554,067 B2
(45) Date of Patent: Feb. 4, 2020

(54) POWER ADAPTER, ELECTRONIC EQUIPMENT, BATTERY CHARGING SYSTEM AND METHOD

(71) Applicant: GUANGDONG OPPO MOBILE TELECOMMUNICATIONS CORP., LTD., Dongguan (CN)

(72) Inventors: Jialiang Zhang, Dongguan (CN);
Fuchun Liao, Dongguan (CN);
Yuanxiang Hu, Dongguan (CN);
Liangcai Peng, Dongguan (CN);
Fengshuo Liu, Dongguan (CN); Kewei Wu, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/596,884

(22) Filed: May 16, 2017

(65) Prior Publication Data

US 2017/0250555 A1   Aug. 31, 2017

Related U.S. Application Data

(63) Continuation of application No. 15/115,203, filed as application No. PCT/CN2014/077556 on May 15, 2014.

(30) Foreign Application Priority Data

Jan. 28, 2014   (CN) .......................... 2014 1 0043148

(51) Int. Cl.
*H02J 7/00*         (2006.01)

(52) U.S. Cl.
CPC .............. *H02J 7/0072* (2013.01); *H02J 7/00* (2013.01); *H02J 7/0029* (2013.01);
(Continued)

(58) Field of Classification Search
CPC .. H02J 7/00; H02J 7/007; H02J 7/0052; H02J 7/0042; H02J 2007/0062;
(Continued)

(56) References Cited

U.S. PATENT DOCUMENTS

| 7,012,405 | B2 * | 3/2006 | Nishida | ................. H02J 7/0073 |
|---|---|---|---|---|
| | | | | 320/137 |
| 7,159,132 | B2 * | 1/2007 | Takahashi | ............... G06F 1/266 |
| | | | | 710/300 |

(Continued)

FOREIGN PATENT DOCUMENTS

| CN | 101123365 A | 2/2008 |
|---|---|---|
| CN | 101299544 A | 11/2008 |

(Continued)

OTHER PUBLICATIONS

Chinese Patent Application No. 201410043148.3 Notification to Grant Patent Right for Invention, with English Translation, dated Sep. 26, 2016, 3 pages.

(Continued)

*Primary Examiner* — Drew A Dunn
*Assistant Examiner* — Tessema Kebede
(74) *Attorney, Agent, or Firm* — Lathrop Gage LLP

(57) ABSTRACT

A power adapter, an electronic equipment, a battery charging system and a battery charging method are provided. The power adapter include a communication interface and charges via the communication interface a battery of the electronic equipment; during charging a battery, the power adapter is configured to: first charge the battery in a regular charging mode; when an output current value of the power adapter falls within a regular current range for a predefined time period, send a quick charge inquiry instruction to the electronic equipment; after receiving a quick charge command sent by the electronic equipment, adjust an output
(Continued)

voltage according to battery voltage information fed back by the electronic equipment; and if the output voltage meets a quick charge voltage requirement predefined, adjust an output current and the output voltage according to a quick charge mode so as to charge the battery.

20 Claims, 9 Drawing Sheets

(52) U.S. Cl.
CPC .......... *H02J 7/0042* (2013.01); *H02J 7/0052* (2013.01); *H02J 2007/006* (2013.01); *H02J 2007/0059* (2013.01); *H02J 2007/0096* (2013.01)

(58) Field of Classification Search
CPC ....... H02J 2007/0096; H02J 2007/0059; H02J 7/0029; H02J 7/0072; H02J 7/004
USPC .......................................................... 320/107
See application file for complete search history.

(56) References Cited

U.S. PATENT DOCUMENTS

| | | | |
|---|---|---|---|
| 7,376,846 | B2 | 5/2008 | Hawkins et al. |
| 8,624,719 | B2 | 1/2014 | Klose et al. |
| 9,379,558 | B2* | 6/2016 | Seethaler ............... H02J 7/0021 |
| 2004/0090209 | A1* | 5/2004 | Nishida ................. H02J 7/0073 320/149 |
| 2004/0164711 | A1* | 8/2004 | Hayashi ................ H02J 7/0055 320/134 |
| 2004/0164714 | A1* | 8/2004 | Hayashi ................ H02J 7/0031 320/137 |
| 2006/0132087 | A1* | 6/2006 | Chen ..................... H02J 7/0031 320/107 |
| 2006/0284595 | A1* | 12/2006 | Hsieh .................... H02J 7/0077 320/115 |
| 2008/0048621 | A1* | 2/2008 | Yun ....................... H02J 7/004 320/136 |
| 2008/0315846 | A1 | 12/2008 | Masanao et al. |
| 2011/0248670 | A1 | 10/2011 | Kazuo et al. |
| 2011/0266874 | A1 | 11/2011 | Albertus et al. |
| 2012/0098495 | A1 | 4/2012 | Yang et al. |
| 2013/0175978 | A1* | 7/2013 | Hsiao ....................... H02J 7/02 320/107 |
| 2015/0137789 | A1* | 5/2015 | Furtner ...................... G05F 5/00 323/318 |
| 2015/0180244 | A1 | 6/2015 | Jung et al. |

FOREIGN PATENT DOCUMENTS

| | | |
|---|---|---|
| CN | 101938160 A | 1/2011 |
| CN | 102122739 A | 7/2011 |
| CN | 201975834 A | 9/2011 |
| CN | 101123365 B | 9/2012 |
| CN | 102957193 A | 3/2013 |
| CN | 103236568 A | 8/2013 |
| CN | 103762702 A | 4/2014 |
| CN | 203747451 U | 7/2014 |
| CN | 203747454 U | 7/2014 |
| EP | 2665153 A2 | 11/2013 |
| JP | H08237947 A | 9/1996 |
| JP | H09168241 A | 6/1997 |
| JP | 2003092841 A | 3/2003 |
| JP | 2007327772 A | 12/2007 |
| JP | 2008035674 A | 2/2008 |
| JP | 2011509466 A | 3/2011 |
| JP | 2012151946 A | 8/2012 |
| JP | 2013198262 A | 9/2013 |
| KR | 20120124372 A | 11/2012 |
| WO | WO 2009057187 A1 | 5/2009 |

OTHER PUBLICATIONS

Chinese Patent Application No. 201410043148.3 First Office Action, with English Translation, dated Apr. 26, 2016, 14 pages.
Translation of the International Search Report and Written Opinion corresponding to International Patent Application No. PCT/CN2014/077556, dated Oct. 28, 2014, 18 pages.
Canadian Patent Application No. 2,938,139 Office Action dated May 24, 2017, 8 pages.
Japanese Patent Application No. 2016-549035 Notification of Reasons for Refusal, with English Translation, dated Jun. 16, 2017, 7 pages.
Chilean Patent Application No. 201601916 Office Action dated Mar. 2, 2018, 7 pages.
Australian Patent Application No. 2014381139 Office Action dated Dec. 6, 2017, 3 pages.
Australian Patent Application No. 2014381139 Office Action dated Jul. 26, 2017, 3 pages.
Chilean Patent Application No. 201601916, Office Action dated Sep. 21, 2017, 6 pages.
Japanese Patent Application No. 2017212198 Office Action dated Dec. 12, 2017, 2 pages.
European Patent Application No. 14881067.4 Extended Search and Opinion dated Oct. 19, 2017, 13 pages.
Singapore Patent Application No. 11201606227T Office Action dated Jun. 27, 2017, 9 pages.
Chinese Patent Application No. 201611041095.7 Office Action dated Jul. 30, 2018, 8 pages.
Chinese Patent Application No. 201611041095.7 English translation of Office Action dated Jul. 30, 2018, 11 pages.
U.S. Appl. No. 15/115,203, Non final Office Action dated May 16, 2018, 25 pp.
Korean Patent Application No. 10-2016-7023510 English translation of Office Action dated Dec. 4, 2018, 4 pages.
Korean Patent Application No. 10-2016-7023510 Office Action dated Dec. 4, 2018, 5 pages.
European Patent Application No. 18203682.2 extended Search and Opinion dated Dec. 13, 2018, 8 pages.
Korean Patent Application No. 10-2019-7027728 Notice of Allowance dated Nov. 15, 2019, 3 pages.
Korean Patent Application No. 10-2019-7027728 English translation of Notice of Allowance dated Nov. 15, 2019, 2 pages.

* cited by examiner

US 10,554,067 B2

POWER ADAPTER, ELECTRONIC EQUIPMENT, BATTERY CHARGING SYSTEM AND METHOD

CROSS-REFERENCE TO RELATED APPLICATIONS

This application is a continuation application based on U.S. application Ser. No. 15/115,203, filed on Jul. 28, 2016, which is a U.S. national phase application based on International Application No. PCT/CN2014/077556, filed on May 15, 2014, which claims priority to Chinese Patent Application No. 201410043148.3, filed on Jan. 28, 2014, the entire contents of which are incorporated herein by reference.

TECHNICAL FIELD

The disclosure belongs to the technical field of charging and particularly relates to a power adapter, an electronic equipment, a battery charging system and a battery charging method.

BACKGROUND

Currently, a battery of an electronic equipment is charged via its power adapter, while the power adapter typically charges the battery in a constant voltage output manner; however, for a high-storage battery, charging the battery in a constant voltage output manner may result in an overlong charging time, and hence the prior art above cannot realize a quick charge for battery to reduce the charging time.

SUMMARY

The disclosure aims to provide a battery charging system to solve the problem that the prior art cannot realize a quick charge for battery to reduce the charging time.

An embodiment of the disclosure is realized as follows. There is provided a power adapter; the power adapter includes a communication interface and charges via the communication interface a battery of an electronic equipment.

During charging the battery, the power adapter is configured to: first charge the battery in a regular charging mode; when an output current value of the power adapter falls within a regular current range for a predefined time period, send a quick charge inquiry instruction to the electronic equipment; after receiving a quick charge command sent by the electronic equipment, adjust an output voltage according to battery voltage information fed back by the electronic equipment; and if the output voltage meets a quick charge voltage requirement predefined, adjust an output current and the output voltage according to a quick charge mode so as to charge the battery.

The disclosure further provides an electronic equipment. The electronic equipment includes a communication interface, a charging control assembly and a battery. Both the charging control assembly and the battery are coupled with the communication interface of the power adapter via the communication interface such that the power adapter communicates with the charging control assembly and charges the battery, and the charging control assembly is also coupled with electrodes of the battery so as to detect a voltage of the battery.

The charging control assembly is configured to: judge whether the battery meets a quick charge requirement, after receiving a quick charge inquiry instruction sent by the power adapter; and send a quick charge command to the power adapter and feedback battery voltage information to the power adapter, if the battery meets the quick charge requirement.

The disclosure further provides a battery charging system. The battery charging system includes the power adapter and the electronic equipment above.

The disclosure further provides a battery charging method based on the battery charging system above, and the battery charging method includes acts as follows:

during charging a battery, a power adapter first charges the battery in a regular charging mode;

when an output current value of the power adapter is within a regular current range for a predefined time period, the power adapter performs a quick charge inquiry communication with the charging control assembly;

after receiving a quick charge command sent by the charging control assembly, the power adapter adjusts an output voltage according to battery voltage information fed back by the charging control assembly;

when the output voltage meets a quick charge voltage requirement predefined by the charging control assembly, the power adapter adjusts an output current and the output voltage according to a quick charge mode so as to charge the battery.

DETAILED DESCRIPTION

In order to make the objective, the technical solutions and the advantages of the present disclosure more clear, the present disclosure is further described in details below in conjunction with the accompanying drawings and embodiments. It should be understood that the specific embodiments described herein are only used to explain the present disclosure, but not used to limit the present disclosure.

Figure 1:
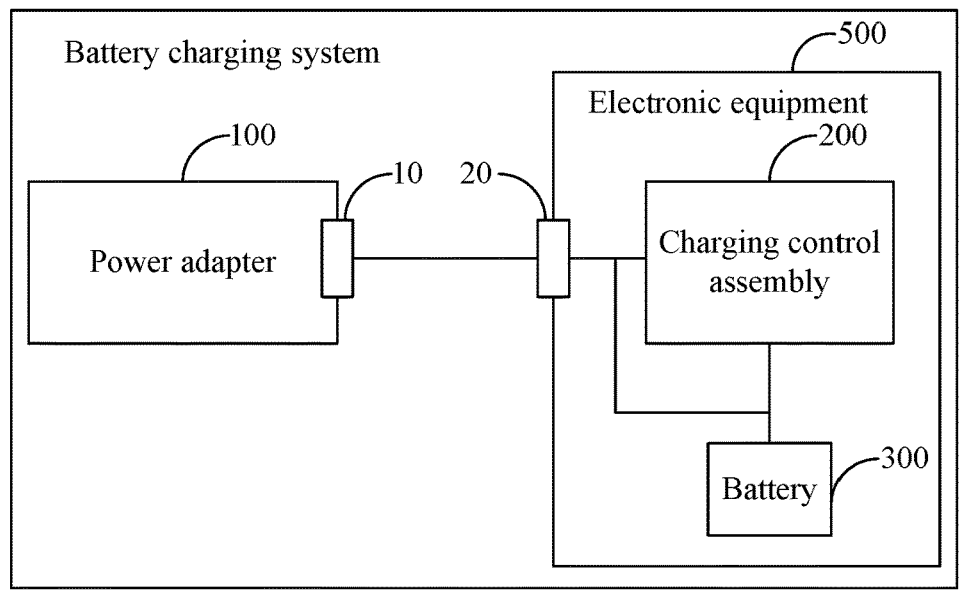
FIG. 1 is a topological structure diagram of a battery charging system provided by an embodiment of the present disclosure.

FIG. 1 shows a topology of a battery charging system provided by an embodiment of the present disclosure, and for illustration purposes, only parts related to the embodiments of the present disclosure are shown, which will be described in details as follows.

The battery charging system provided by an embodiment of the present disclosure includes a power adapter 100 and an electronic equipment 500. The power adapter 100 includes a communication interface 10 and charges a battery 300 of the electronic equipment 500 via the communication interface 10 thereof. The electronic equipment 500 includes a communication interface 20, a charging control assembly 200 and the battery 300. The charging control assembly 200 and the battery 300 are electrically coupled with the communication interface 10 of the power adapter 100 via the communication interface 20 of the electronic equipment 500, such that the power adapter 100 communicates with the charging control assembly 200 and charges the battery 300. And the charging control assembly 200 is also coupled with electrodes of the battery 300 to detect a voltage of the battery 300. Each of the communication interface 10 of the power adapter 100 and the communication interface 20 of the electronic equipment may be a USB interface, including a common USB interface or a mini-USB interface (i.e. Micro-USB interface).

The power adapter 100 is configured to charge the battery in a regular charging mode, to send a quick charge inquiry instruction to the electronic equipment 500 when an output current value of the power adapter 100 falls within a regular current range for a predefined time period, to adjust an output voltage according to battery voltage information fed back by the electronic equipment 500 after receiving a quick charge command sent by the electronic equipment 500, and to adjust an output current and the output voltage according to a quick charge mode so as to charge the battery 300 if the output voltage meets a quick charge voltage requirement predefined.

The charging control assembly 200 is configured to judge whether the battery meets a quick charge requirement, after receiving a quick charge inquiry instruction sent by the power adapter 100 and to send a quick charge command to the power adapter 100 and feedback battery voltage information to the power adapter 100, if the battery 300 meets the quick charge requirement. In an embodiment, the quick charge requirement includes a condition that: a voltage of the battery 300 reaches a quick charge voltage value.

In an embodiment, the charging control assembly 200 is further configured to control a quick charge shunt circuit to turn on so as to introduce a part of output current of the power adapter 100 through the quick charge shunt circuit, for quick-charging the battery, if the output voltage meets the quick charge voltage requirement predefined.

During charging the battery 300, the power adapter 100 first charges the battery 300 in a regular charging mode. When an output current value of the power adapter 100 is within a regular current range for a predefined time period, the power adapter 100 performs a quick charge inquiry communication with the charging control assembly 200; after the charging control assembly 200 sends a quick charge command to the power adapter 100, the power adapter 100 adjusts an output voltage according to battery voltage information fed back by the charging control assembly 200; and when this output voltage meets a quick charge voltage requirement predefined in the charging control assembly 200, the power adapter 100 adjusts output current and the output voltage according to a quick charge mode so as to charge the battery 300, and the charging control assembly 200 simultaneously introduces direct current from the power adapter 100 to charge the battery 300.

Figure 2:
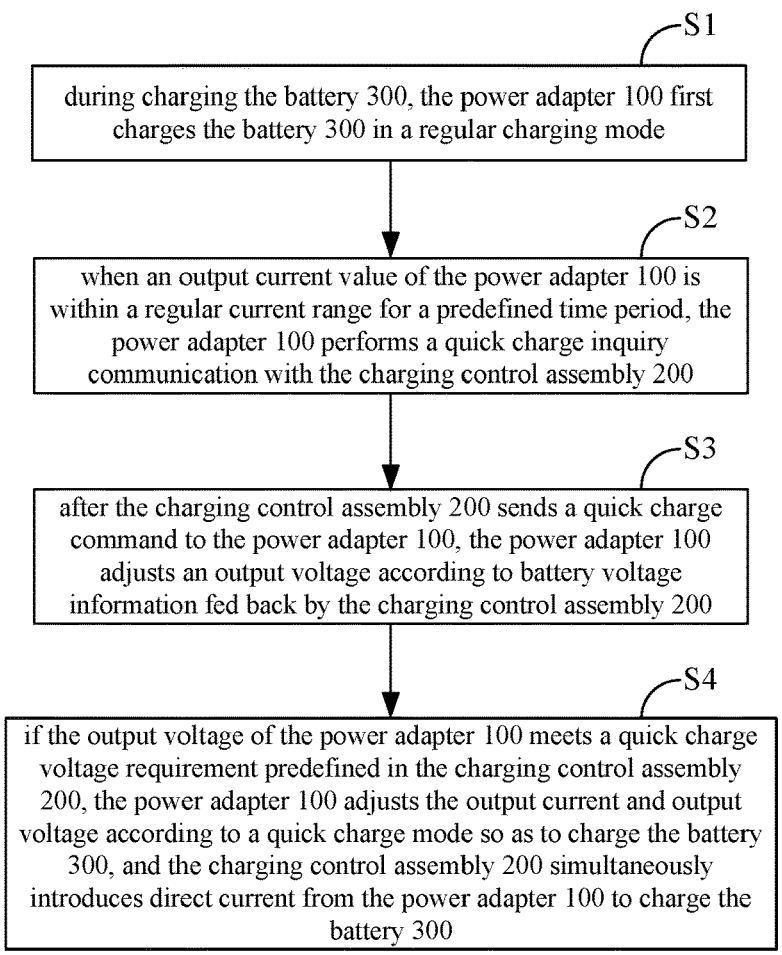
FIG. 2 is a flow chart of a battery charging method based on the battery charging system as shown in FIG. 1.

Based on the battery charging system as shown in FIG. 1, an embodiment of the disclosure may further provide a battery charging method, as shown in FIG. 2, such battery charging method includes acts as follows.

In block S1, during charging the battery 300, the power adapter 100 first charges the battery 300 in a regular charging mode.

In block S2, when an output current value of the power adapter 100 is within a regular current range for a predefined time period, the power adapter 100 performs a quick charge inquiry communication with the charging control assembly 200.

In block S3, after the charging control assembly 200 sends a quick charge command to the power adapter 100, the power adapter 100 adjusts an output voltage according to battery voltage information fed back by the charging control assembly 200.

In block S4, if the output voltage of the power adapter 100 meets a quick charge voltage requirement predefined in the charging control assembly 200, the power adapter 100 adjusts the output current and output voltage according to a quick charge mode so as to charge the battery 300, and the charging control assembly 200 simultaneously introduces direct current from the power adapter 100 to charge the battery 300.

In at least one embodiment, the predefined time period may be 3 S (seconds), and the regular current range may be set as [1 A, 4 A].

Figure 3:
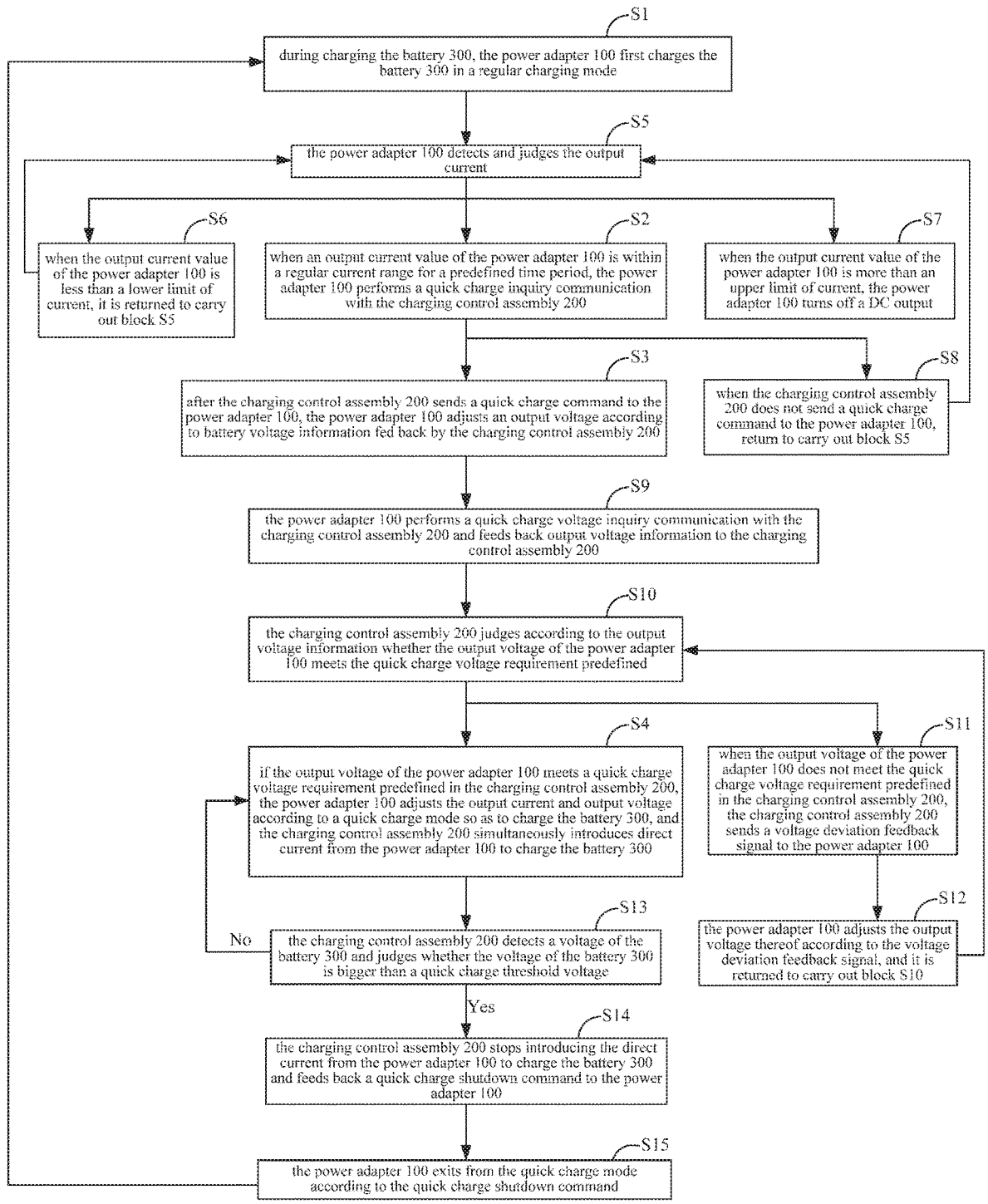
FIG. 3 is another flow chart of a battery charging method based on the battery charging system as shown in FIG. 1.

In consideration that the output current value of the power adapter 100 may not be within the regular current range, as a result, based on the battery charging method as shown in FIG. 2, as shown in FIG. 3, after block S1, it further includes acts as follows.

In block S5, the power adapter 100 detects and judges the output current.

In block S6, when the output current value of the power adapter 100 is less than a lower limit of current, it is returned to carry out block S5.

In block S7, when the output current value of the power adapter 100 is more than an upper limit of current, the power adapter 100 turns off a DC output. In other words, it can be judged as output short-circuited at this moment, and as a result, the power adapter 100 turns off the DC output to realize the short-circuit protection.

In this embodiment, the block S6 and the block S7 above are acts parallel with block S2 and are applied to respond to circumstances that the output current value of the power adapter 100 is less than the lower limit of current and that the output current value of the power adapter 100 is more than the upper limit of current, respectively. The lower limit of current may be 1 A, and the upper limit of current above may be 4 A.

After carrying out block S2 above, in consideration that the charging control assembly 200 may not send the quick charge command to the power adapter 100 (including communication failure or the charging control assembly 200 feeding back a quick charge rejection command), as a result, in the battery charging method as shown in FIG. 3, after block S2, it further includes acts as follows.

In block S8, when the charging control assembly 200 does not send a quick charge command to the power adapter 100, it is returned to carry out block S5.

It can thus be seen that block S8 is an act parallel with block S3, that is, if the charging control assembly 200 does not instruct the power adapter 100 to enter into the quick charge mode, the power adapter 100 continues to detect and judge the output current.

As shown in FIG. 3, between block S3 and block S4, the battery charging method further includes acts as follows.

In block S9, the power adapter 100 performs a quick charge voltage inquiry communication with the charging control assembly 200 and feeds back output voltage information to the charging control assembly 200.

In block S10, the charging control assembly 200 judges according to the output voltage information whether the output voltage of the power adapter 100 meets the quick charge voltage requirement predefined.

In this embodiment, the quick charge voltage requirement above may be a rated range of quick charge voltage or a rated value of quick charge voltage. That is, if the output voltage of the power adapter 100 is within the rated range of quick charge voltage or equal to the rated value of quick charge voltage, the output voltage of the power adapter 100 meets the quick charge voltage requirement. If the charging control assembly 200 does not feed back any signal to the power adapter 100 after block S10, it means the communication between the power adapter 100 and the charging control assembly 200 fails, and the power adapter 100 requires a reset operation.

In addition, in consideration that the output voltage of the power adapter 100 may not meet the quick charge voltage requirement predefined in the charging control assembly 200, as shown in FIG. 3, between block S10 and block S4, the method further includes acts as follows.

In block S11, when the output voltage of the power adapter 100 does not meet the quick charge voltage requirement predefined in the charging control assembly 200, the charging control assembly 200 sends a voltage deviation feedback signal to the power adapter 100.

In block S12, the power adapter 100 adjusts the output voltage thereof according to the voltage deviation feedback signal, and it is returned to carry out block S10.

In at least one embodiment, the voltage deviation feedback signal includes a low voltage feedback signal and a high voltage feedback signal. If the voltage is low, the power adapter 100 increases the output voltage according to the low voltage feedback signal, and if the voltage is high, the power adapter 100 lowers the output voltage according to the high voltage feedback signal.

In addition, as shown in FIG. 3, after block S4, the battery charging method further includes acts as follows.

In block S13, the charging control assembly 200 detects a voltage of the battery 300 and judges whether the voltage of the battery 300 is bigger than a quick charge threshold voltage; if yes, block S14 is carried out, and if not, it is returned to carry out block S4.

In block S14, the charging control assembly 200 stops introducing the direct current from the power adapter 100 to charge the battery 300 and feeds back a quick charge shutdown command to the power adapter 100.

In block S15, the power adapter 100 exits from the quick charge mode according to the quick charge shutdown command above, and it is returned to carry out block S1.

Figure 4:
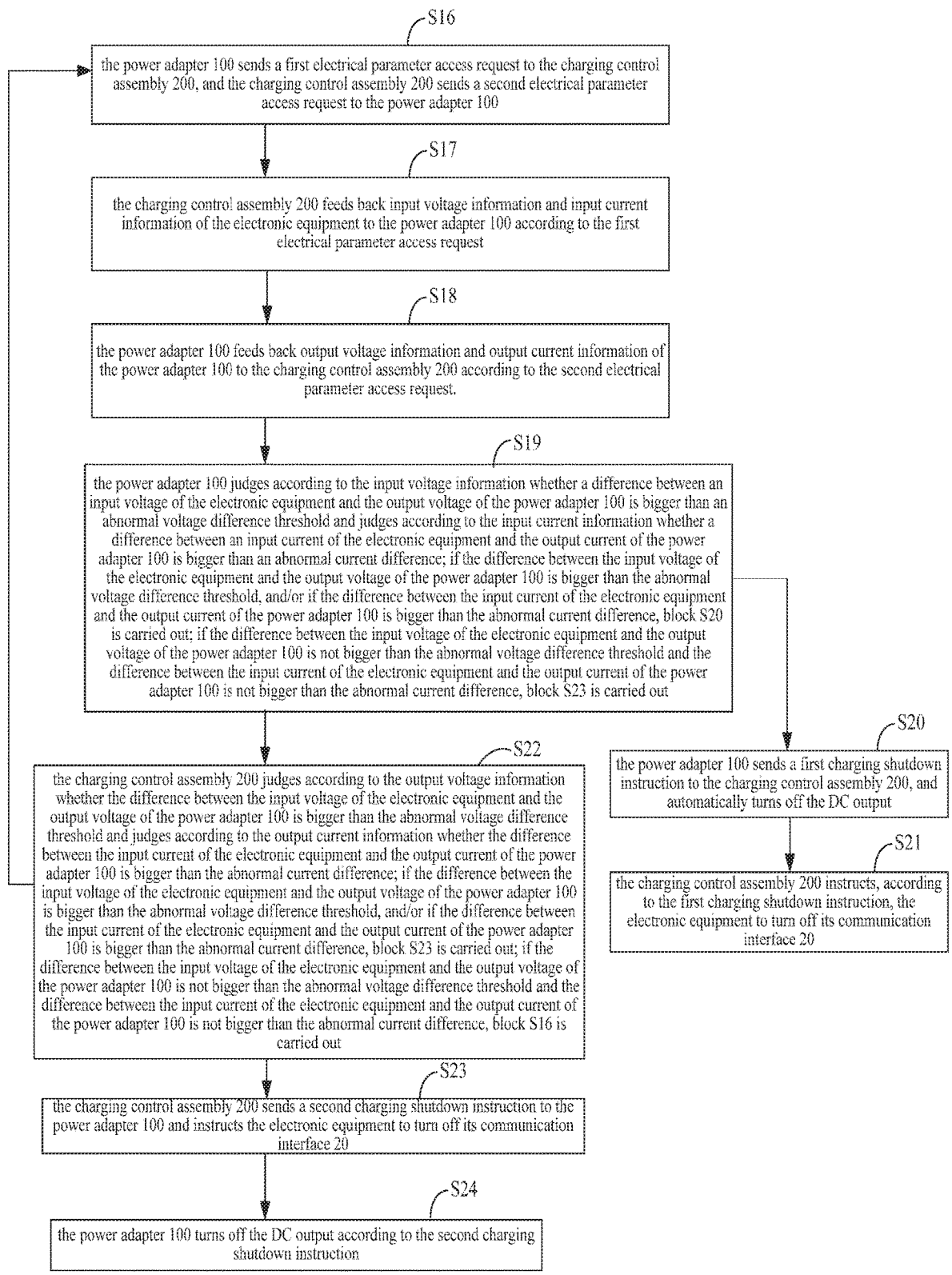
FIG. 4 is a partial flow chart of acts included in the battery charging method as shown in FIG. 2 and FIG. 3 after act S4.

In the quick charge mode above, in order to judge whether a circuit impedance between the power adapter 100 and the charging control assembly 200 is abnormal, so as to further judge whether a coupling (including interface coupling, battery contact and wires) between the power adapter 100 and the charging control assembly 200 is abnormal and to stop charging to protect the power adapter 100 and the electronic equipment if it is judged as abnormal, the battery charging method further includes the following acts executed simultaneously with block S4, as shown in FIG. 4.

In block S16, the power adapter 100 sends a first electrical parameter access request to the charging control assembly 200, and the charging control assembly 200 sends a second electrical parameter access request to the power adapter 100.

In block S17, the charging control assembly 200 feeds back input voltage information and input current information of the electronic equipment to the power adapter 100 according to the first electrical parameter access request.

In block S18, the power adapter 100 feeds back output voltage information and output current information of the power adapter 100 to the charging control assembly 200 according to the second electrical parameter access request.

In block S19, the power adapter 100 judges according to the input voltage information whether a difference between an input voltage of the electronic equipment and the output voltage of the power adapter 100 is bigger than an abnormal voltage difference threshold and judges according to the input current information whether a difference between an input current of the electronic equipment and the output current of the power adapter 100 is bigger than an abnormal current difference; if the difference between the input voltage of the electronic equipment and the output voltage of the power adapter 100 is bigger than the abnormal voltage difference threshold, and/or if the difference between the input current of the electronic equipment and the output current of the power adapter 100 is bigger than the abnormal current difference, block S20 is carried out; if the difference between the input voltage of the electronic equipment and the output voltage of the power adapter 100 is not bigger than the abnormal voltage difference threshold and the difference between the input current of the electronic equipment and the output current of the power adapter 100 is not bigger than the abnormal current difference, block S22 is carried out.

In block S20, the power adapter 100 sends a first charging shutdown instruction to the charging control assembly 200, and automatically turns off the DC output.

In block S21, the charging control assembly 200 instructs, according to the first charging shutdown instruction, the electronic equipment to turn off its communication interface 20.

In block S22, the charging control assembly 200 judges according to the output voltage information whether the difference between the input voltage of the electronic equipment and the output voltage of the power adapter 100 is bigger than the abnormal voltage difference threshold and judges according to the output current information whether the difference between the input current of the electronic equipment and the output current of the power adapter 100 is bigger than the abnormal current difference; if the difference between the input voltage of the electronic equipment and the output voltage of the power adapter 100 is bigger than the abnormal voltage difference threshold, and/or if the difference between the input current of the electronic equipment and the output current of the power adapter 100 is bigger than the abnormal current difference, block S23 is carried out; if the difference between the input voltage of the electronic equipment and the output voltage of the power adapter 100 is not bigger than the abnormal voltage difference threshold and the difference between the input current of the electronic equipment and the output current of the power adapter 100 is not bigger than the abnormal current difference, block S16 is carried out.

In block S23, the charging control assembly 200 sends a second charging shutdown instruction to the power adapter 100 and instructs the electronic equipment to turn off its communication interface 20.

In block S24, the power adapter 100 turns off the DC output according to the second charging shutdown instruction.

In at least one embodiment, the input voltage information of equipment and the input current information of equipment refer to the input voltage information and the input current information of the electronic equipment, respectively.

Figure 5:
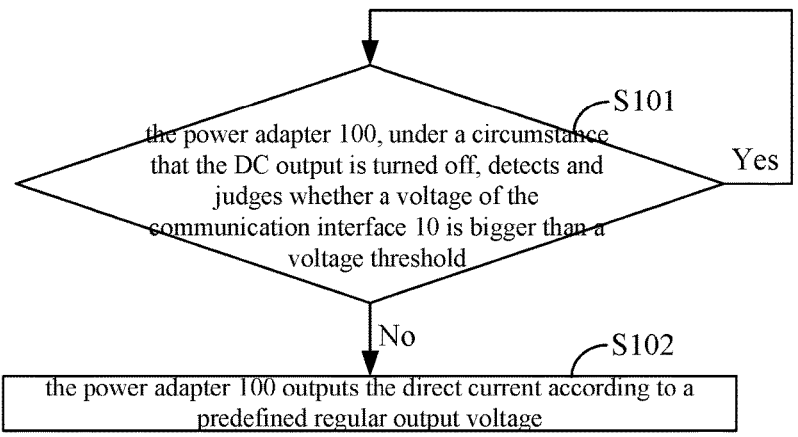
FIG. 5 is an example flow chart of act S1 in the battery charging method as shown in FIG. 2 and FIG. 3.

Furthermore, in block S1 as shown in FIG. 2 and FIG. 3 above, the act of charging by the power adapter 100 the battery 300 in a regular charging mode includes the following acts (as shown in FIG. 5).

In block S101, the power adapter 100, under a circumstance that the DC output is turned off, detects and judges whether a voltage of the communication interface 10 is bigger than a voltage threshold; if yes, it is continued to carry out block S101 (it is indicated that the charging control assembly 200 does not yet exit from the quick charge mode at this moment), and if not, block S102 is carried out.

In block S102, the power adapter 100 outputs the direct current according to a predefined regular output voltage.

In this embodiment, in the block S101, detecting the voltage of the communication interface 10 of the power adapter 100 is to avoid the situation that the battery 300 is over-charged since the power adapter 100 continues to carry out quick charge for the battery 300 due to the charging control assembly 200 not exiting from the last quick charge mode. The voltage threshold may be 2 V, and the regular output voltage may be set as 5.1 V.

Figure 6:
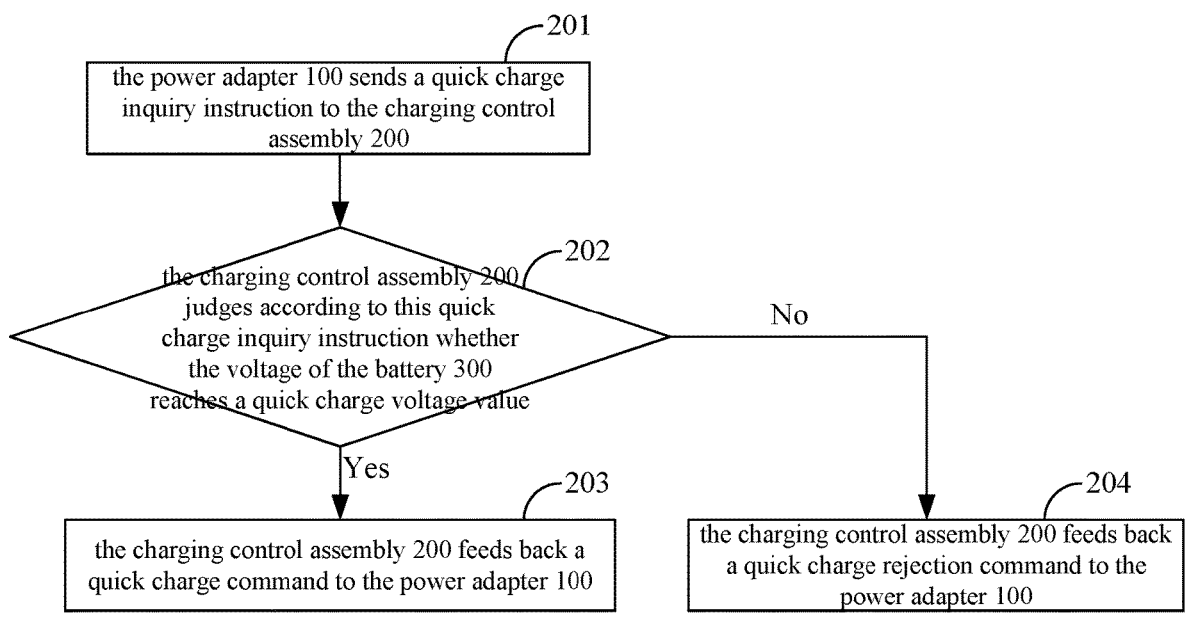
FIG. 6 is an example flow chart of act S2 in the battery charging method as shown in FIG. 2 and FIG. 3.

Furthermore, in block S2 as shown in FIG. 2 and FIG. 3 above, the act of performing by the power adapter 100 a quick charge inquiry communication with the charging control assembly 200 includes the following acts (as shown in FIG. 6).

In block S201, the power adapter 100 sends a quick charge inquiry instruction to the charging control assembly 200.

In block S202, the charging control assembly 200 judges according to this quick charge inquiry instruction whether the voltage of the battery 300 reaches a quick charge voltage value; if yes, block S203 is carried out, and if not, block S204 is carried out.

In block S203, the charging control assembly 200 feeds back a quick charge command to the power adapter 100.

In block S204, the charging control assembly 200 feeds back a quick charge rejection command to the power adapter 100.

Figure 7:
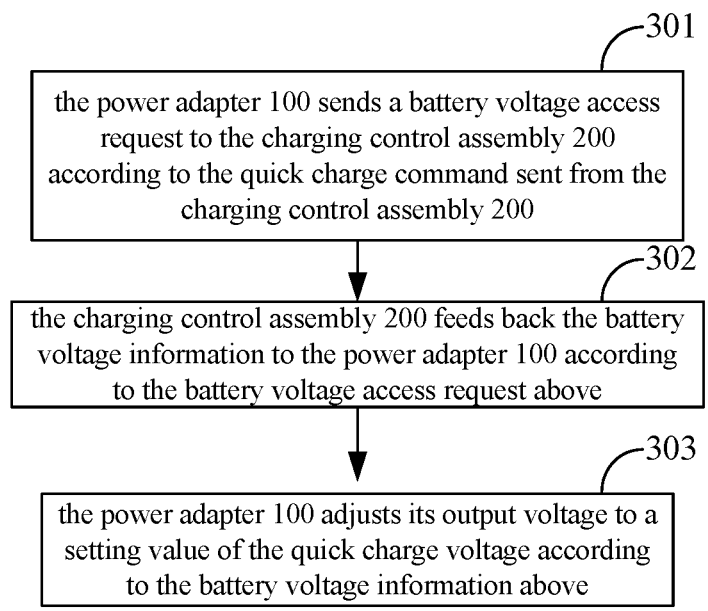
FIG. 7 is an example flow chart of act S3 in the battery charging method as shown in FIG. 2 and FIG. 3.

Furthermore, in block S3 as shown in FIG. 2 and FIG. 3 above, the act of adjusting by the power adapter 100 the output voltage according to the battery voltage information fed back from the charging control assembly 200 includes the following acts (as shown in FIG. 7).

In block S301, the power adapter 100 sends a battery voltage access request to the charging control assembly 200 according to the quick charge command sent from the charging control assembly 200.

In block S302, the charging control assembly 200 feeds back the battery voltage information to the power adapter 100 according to the battery voltage access request above.

In block S303, the power adapter 100 adjusts its output voltage to a setting value of the quick charge voltage according to the battery voltage information above.

In at least one embodiment, the setting value of the quick charge voltage may be set as a sum of the battery voltage and a predefined voltage increment (such as 0.2 V). In addition, if the charging control assembly 200 does not respond to the battery voltage access request sent from the power adapter 100 in block S302 above, the communication between the power adapter 100 and the charging control assembly 200 fails, and the power adapter 100 carries out a reset operation at this moment.

Figure 8:
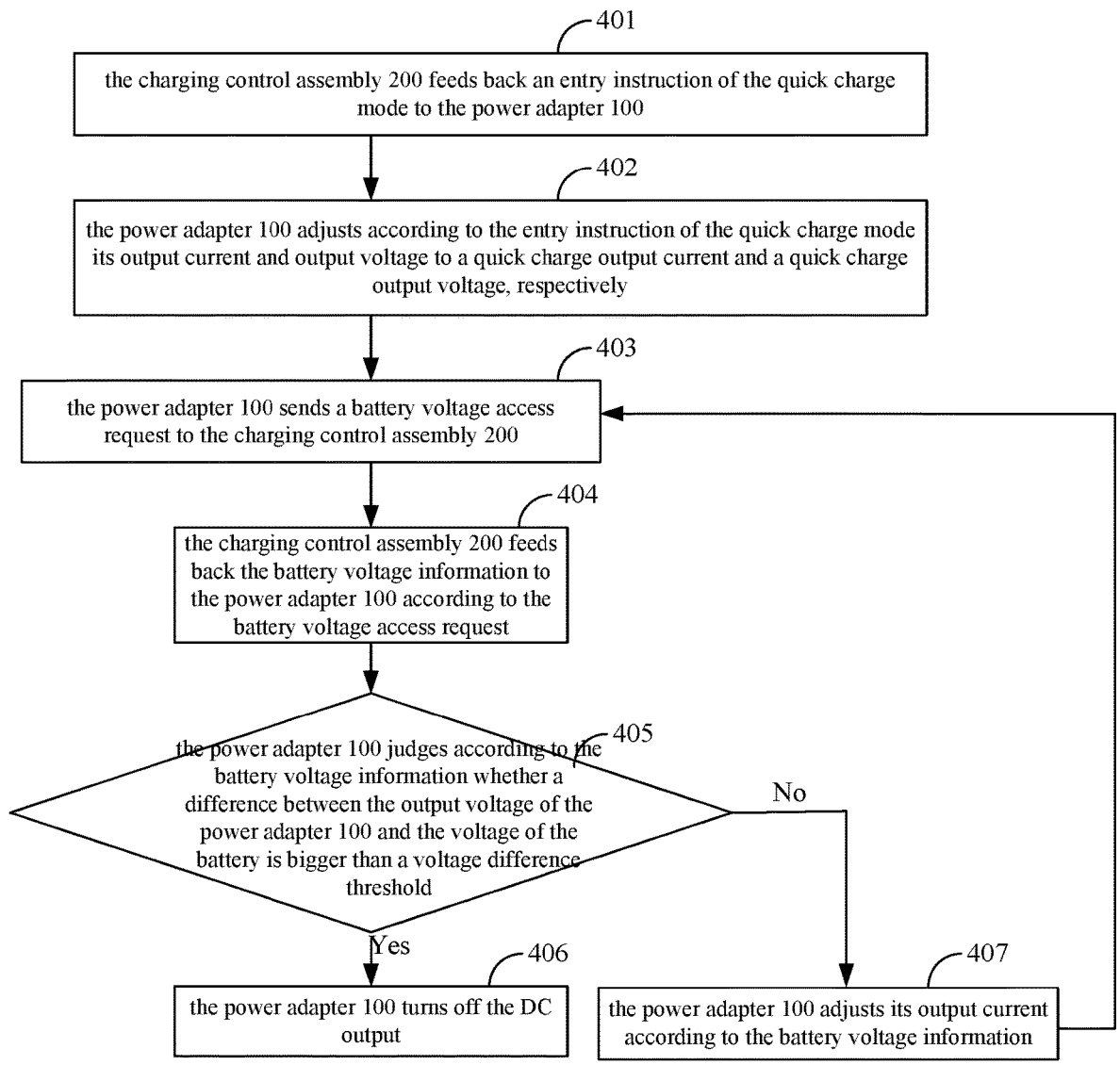
FIG. 8 is an example flow chart of act S4 in the battery charging method as shown in FIG. 2 and FIG. 3.

Furthermore, in block S4 as shown in FIG. 2 and FIG. 3 above, the act of adjusting by the power adapter 100 the output current and output voltage according to the quick charge mode so as to charge the battery 300 includes the following acts (as shown in FIG. 8).

In block S401, the charging control assembly 200 feeds back an entry instruction of the quick charge mode to the power adapter 100.

In block S402, the power adapter 100 adjusts according to the entry instruction of the quick charge mode its output current and output voltage to a quick charge output current and a quick charge output voltage, respectively.

In block S403, the power adapter 100 sends a battery voltage access request to the charging control assembly 200.

In block S404, the charging control assembly 200 feeds back the battery voltage information to the power adapter 100 according to the battery voltage access request.

In block S405, the power adapter 100 judges according to the battery voltage information whether a difference between the output voltage of the power adapter 100 and the voltage of the battery is bigger than a voltage difference threshold; if yes, block S406 is carried out (it is indicated that the circuit impedance between the power adapter 100 and both the charging control assembly 200 and the battery 300 is abnormal, and the power adapter 100 is required to stop outputting direct current), and if not, block S407 is carried out.

In block S406, the power adapter 100 turns off the DC output.

In block S407, the power adapter 100 adjusts its output current according to the battery voltage information, and it is returned to carry out block S403 so as to cyclically adjust the output current during the quick charge process of the battery 300, thus optimizing the quick charge process of the battery 300 for the purpose of shortening the charging time.

In at least one embodiment, the quick charge output current above may be set as 4 A, the quick charge output voltage may be set as any value between 3.4 V and 4.8 V, and the voltage difference threshold may be 0.8 V.

Figure 9:
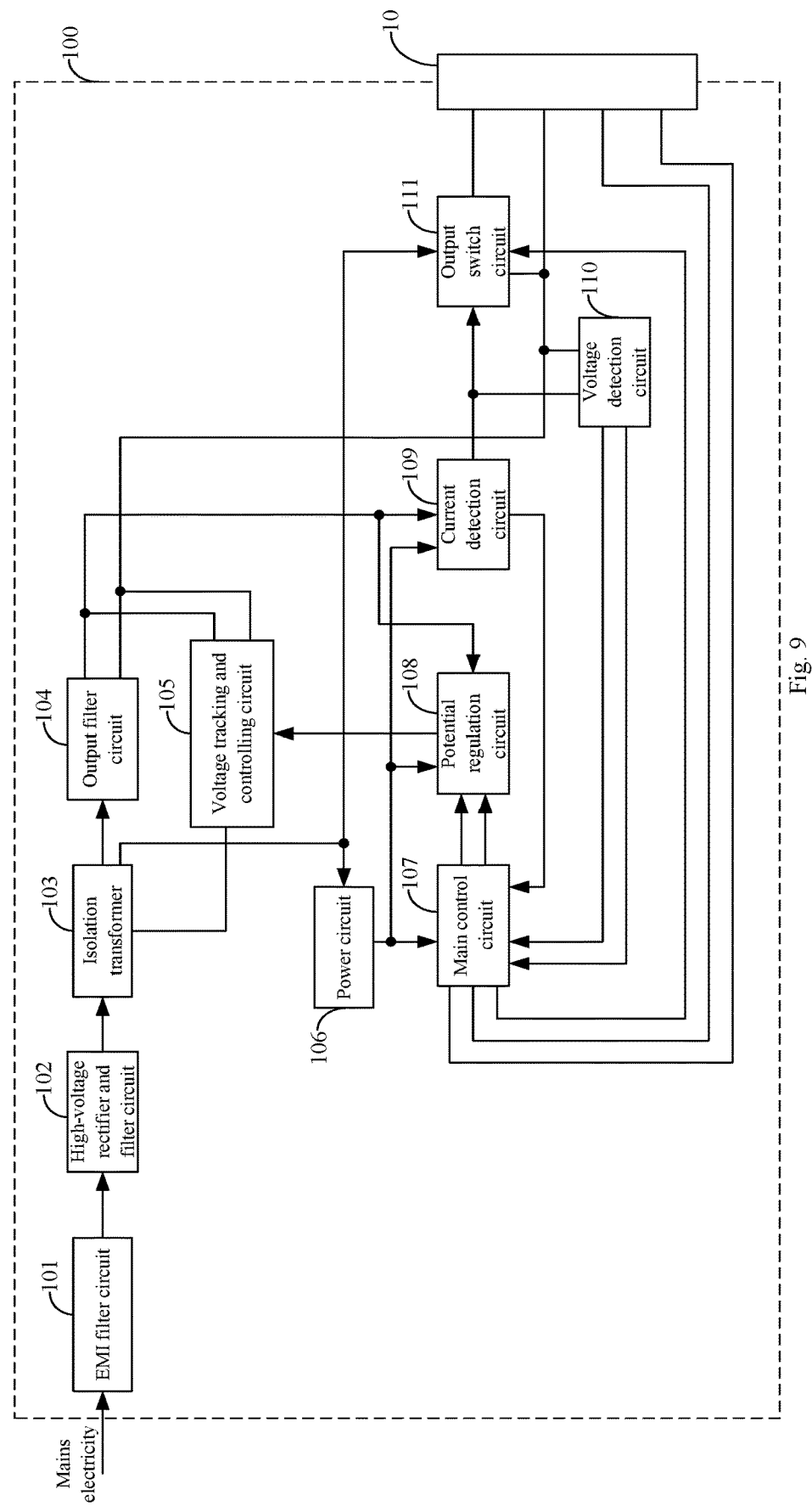
FIG. 9 is an example block diagram of a power adapter provided by an embodiment of the present disclosure.

FIG. 9 shows an example block diagram of a power adapter, for illustration purpose, only parts related to embodiments of the present disclosure are shown, which will be described in details as follows.

The power adapter 100 includes an EMI filter circuit 101, a high-voltage rectifier and filter circuit 102, an isolation transformer 103, an output filter circuit 104 and a voltage tracking and controlling circuit 105. After the EMI of mains electricity is filtered by the EMI filter circuit 101, a rectifying and filtering process is conducted by the high-voltage rectifier and filter circuit 102 to output high-voltage direct current. After passing through the isolation transformer 103 for an electrical isolation and being outputted to the output filter circuit 104 to be filtered, the high-voltage direct current can be used to charge the battery. The voltage tracking and controlling circuit 105 adjusts an output voltage of the isolation transformer 103 according to an output voltage of the output filter circuit 104.

The power adapter 100 further includes a power circuit 106, a main control circuit 107, a potential regulation circuit 108, a current detection circuit 109, a voltage detection circuit 110 and an output switch circuit 111.

Figure 10:
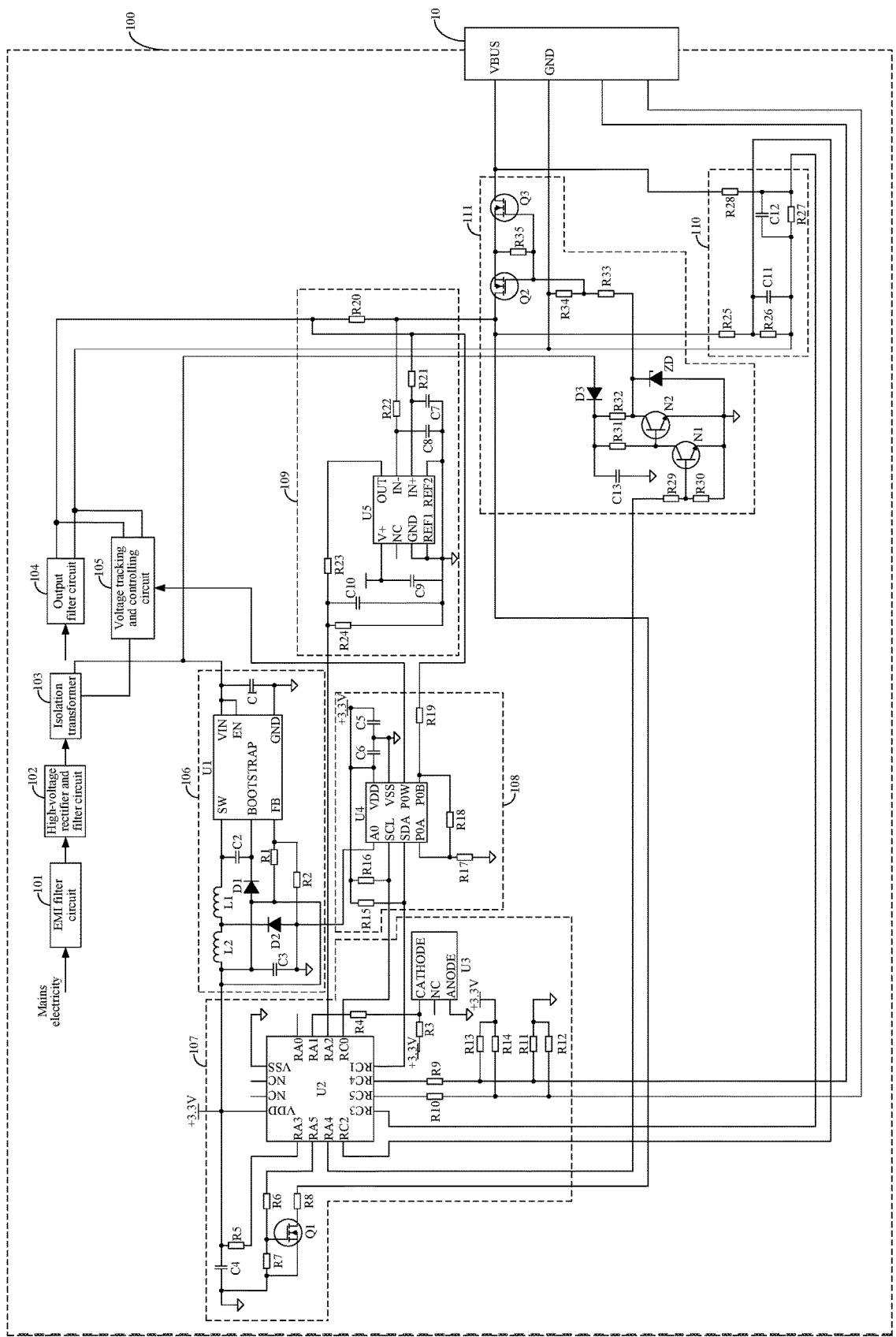
FIG. 10 is an example circuit diagram of the power adapter as shown in FIG. 9.

Please refer to FIG. 9 and FIG. 10, an input terminal of the power circuit 106 is coupled with a secondary terminal of the isolation transformer 103. A power terminal of the main control circuit 107, a power terminal of the potential regulation circuit 108, and a power terminal of the current detection circuit 109 are jointly coupled with an output terminal of the power circuit 106. Both a high-potential terminal of the main control circuit 107 and a high-potential terminal of the potential regulation circuit 108 are coupled with a positive output terminal of the output filter circuit 104. The high-level end of the main control circuit 107 is coupled with the positive output end of the output filter circuit 104 via a second terminal of a twentieth resistor R20 (i.e., a DC output terminal of the current detection circuit 109). A potential regulation terminal of the potential regulation circuit 108 is coupled with the voltage tracking and controlling circuit 105. A DC input terminal of the current detection circuit 109 is coupled with the positive output terminal of the output filter circuit 104. A current-feedback terminal of the current detection circuit 109 is coupled with a current detection terminal of the main control circuit 107. A clock output terminal and a data output terminal of the main control circuit 107 are coupled with a clock input terminal and a data input terminal of the potential regulation circuit 108, respectively. A first detection terminal and a second detection terminal of the voltage detection circuit 110 are coupled with the DC output terminal of the current detection circuit 109 and a negative output terminal of the output filter circuit 104, respectively. A first output terminal and a second output terminal of the voltage detection circuit 110 are coupled with a first voltage detection terminal and a second voltage detection terminal of the main control circuit 107, respectively. An input terminal of the output switch circuit 111 is coupled with the DC output terminal of the current detection circuit 109. An output terminal of the output switch circuit 111 is coupled with a third detection terminal of the voltage detection circuit 110. A ground terminal of the output switch circuit 111 is coupled with the negative output terminal of the output filter circuit 104, a controlled terminal and a power terminal of the output switch circuit 111 are coupled with a switch control terminal of the main control circuit 107 and the secondary terminal of the isolation transformer 103, respectively. And the negative output terminal of the output filter circuit 104, the output terminal of the output switch circuit 111, a first communication terminal and a second communication terminal of the main control circuit 107 are all coupled with the communication interface 10 of the power adapter 100.

When the power adapter 100 first charges the battery 300 in a regular charging mode, the main control circuit 107 controls the output switch circuit 111 to turn off the DC output of the power adapter 100. The voltage detection circuit 110 detects the output voltage of the power adapter 100 and feeds back a voltage detection signal to the main control circuit 107. According to the voltage detection signal, the main control circuit 107 judges whether the output voltage of the power adapter 100 is bigger than a voltage threshold; if yes, the voltage detection circuit 110 continues to judge the output voltage of the power adapter 100; if not, the main control circuit 107 controls the output switch circuit 111 to turn on the DC output of the power adapter 100 and drives the voltage tracking and controlling circuit 105 through the potential regulation circuit 108 to set the output voltage of the isolation transformer 103 as a regular output voltage; the current detection circuit 109 detects the output current of the power adapter 100 and feeds back a current detection signal to the main control circuit 107; if the main control circuit 107 judges according to the current detection signal that the output current of the power adapter 100 is within the regular current range for the predefined time period, the main control circuit 107 performs a quick charge inquiry communication with the charging control assembly 200; after the charging control assembly 200 sends a quick charge command to the main control circuit 107, the main control circuit 107 drives, according to the battery voltage information fed back from the charging control assembly 200 and through the potential regulation circuit 108, the voltage tracking and controlling circuit 105 to adjust the output voltage of the isolation transformer 103 (i.e., adjusting the output voltage of the power adapter 100); if the output voltage of the power adapter 100 meets the quick charge voltage requirement predefined in the charging control assembly 200, through the potential regulation circuit 108, the main control circuit 107 drives the voltage tracking and controlling circuit 105 to adjust the output voltage of the isolation transformer 103 so as to enable the power adapter 100 to output direct current on the basis of a quick charge output current and a quick charge output voltage, and the charging control assembly 200 simultaneously introduces direct current from the power adapter 100 for charging the battery 300.

In this embodiment, when the power adapter 100 first charges the battery 300 in a regular charging mode, if the output current value of the power adapter 100 is less than the lower limit of current (such as 1 A), the current detection circuit 109 continues to detect the output current of the power adapter 100 and feed back the current detection signal to the main control circuit 107; if the output current value of the power adapter 100 is more than the upper limit of current (such as 4 A), the main control circuit 107 controls the output switch circuit 111 to turn off the DC output of the power adapter 100 to realize short-circuit protection.

During the quick charge inquiry communication performed by the main control circuit 107 with the charging control assembly 200 above, the main control circuit 107 sends a quick charge inquiry instruction to the charging control assembly 200, the charging control assembly 200 judges according to the quick charge inquiry instruction whether the voltage of the battery 300 reaches the quick charge voltage value, if yes, a quick charge command is fed back to the main control circuit 107, and if not, a quick charge rejection command is fed back to the main control circuit 107.

During the above process that the main control circuit 107 drives, according to the battery voltage information fed back from the charging control assembly 200 and through the potential regulation circuit 108, the voltage tracking and controlling circuit 105 to adjust the output voltage of the isolation transformer 103, the main control circuit 107 sends a battery voltage access request to the charging control assembly 200 according to the quick charge command sent from the charging control assembly 200, the charging control assembly 200 feeds back the battery voltage information to the main control circuit 107 according to the battery voltage access request, according to the battery voltage information and through the potential regulation circuit 108 the main control circuit 107 drives the voltage tracking and controlling circuit 105 to adjust the output voltage of the isolation transformer 103 to the above setting value of the quick charge voltage.

If the output voltage of the power adapter 100 meets the quick charge voltage requirement predefined in the charging control assembly 200 (namely in the rated range of the quick charge voltage or equal to the rated value of the quick charge voltage), the main control circuit 107 drives, through the potential regulation circuit 108, the voltage tracking and controlling circuit 105 to adjust the output voltage of the isolation transformer 103, such that the power adapter 100 outputs direct current on the basis of the quick charge output current and quick charge output voltage, and the process of the charging control assembly 200 simultaneously introducing direct current from the power adapter 100 to charge the battery 300 may be as follows.

The main control circuit 107 performs a quick charge voltage inquiry communication with the charging control assembly 200, and the main control circuit 107 feeds back the output voltage information to the charging control assembly 200; if the output voltage of the power adapter 100 is in the rated range of the quick charge voltage or equal to the rated value of the quick charge voltage, the charging control assembly 200 determines that the output voltage of the power adapter 100 meets the quick charge voltage requirement predefined in the charging control assembly 200, and feeds back the entry instruction of the quick charge mode to the main control circuit 107; according to the entry instruction of the quick charge mode and through the potential regulation circuit 108, the main control circuit 107 drives the voltage tracking and controlling circuit 105 to adjust the output voltage of the isolation transformer 103, such that the power adapter 100 outputs direct current on the basis of the quick charge output current and quick charge output voltage, and the charging control assembly 200 simultaneously introduces direct current from the power adapter 100 to charge the battery 300. In addition, if the output voltage of the power adapter 100 does not meet the quick charge voltage requirement predefined in the charging control assembly 200 (namely beyond the rated range of the quick charge voltage or unequal to the rated value of the quick charge voltage), the charging control assembly 200 sends the voltage deviation feedback signal to the main control circuit 107, the main control circuit 107 drives, according to the voltage deviation feedback signal and through the potential regulation circuit 108, the voltage tracking and controlling circuit 105 to adjust the output voltage of the isolation transformer 103, and then continues to perform a quick charge voltage inquiry communication with the charging control assembly 200. In an embodiment, the voltage deviation feedback signal includes the low voltage feedback signal and the high voltage feedback signal, if the voltage is low, the main control circuit 107 drives the voltage tracking and controlling circuit 105 according to the low voltage feedback signal and through the potential regulation circuit 108 to increase the output voltage of the isolation transformer 103; if the voltage is high, the main control circuit 107 drives the voltage tracking and controlling circuit 105 according to the high voltage feedback signal and through the potential regulation circuit 108 to decrease the output voltage of the isolation transformer 103.

Further, the above process that the main control circuit 107 drives, according to the entry instruction of the quick charge mode and through the potential regulation circuit 108, the voltage tracking and controlling circuit 105 to adjust the output voltage of the isolation transformer 103 such that the power adapter 100 outputs direct current on the basis of the quick charge output current and quick charge output voltage may be as follows.

The main control circuit 107 drives the voltage tracking and controlling circuit 105 through the potential regulation circuit 108 to adjust the output voltage of the isolation transformer 103, so that the output current and output voltage of the power adapter 100 are regulated as the quick charge output current (for example, 4 A) and the quick charge output voltage (such as any value between 3.4V~4.8V), the main control circuit 107 acquires battery voltage information from the charging control assembly 300 and judges according to the voltage detection signal fed back by the voltage detection circuit 110 whether the difference between the output voltage of the power adapter 100 and the voltage of the battery is more than the voltage difference threshold (for example, 0.8V); if yes, it indicates that the circuit impedance among the power adapter 100 and the charging control assembly 200 and the battery 300 is abnormal, the main control circuit 107 controls the output switch circuit 111 to turn off the DC output of the power adapter 100, and if not, the main control circuit 107 drives the voltage tracking and controlling circuit 105 according to the battery voltage information and through the potential regulation circuit 108 to adjust the output voltage of the isolation transformer 103 so as to adjust the output current of the power adapter 100, and continues to acquire battery voltage information from the charging control assembly 300, so as to cyclically adjust the output current of the power adapter 100 during the quick charge process of battery 300, thus optimizing the quick charge process of battery 300 for the purpose of shortening the charging time.

In addition, in the meantime the main control circuit 107 drives the voltage tracking and controlling circuit 105 via the potential regulation circuit 108 to adjust the output voltage of the isolation transformer 103 such that the power adapter 100 outputs direct current on the basis of the quick charge output current and quick charge output voltage, the charging control assembly 200 detects the voltage of the battery 300; if the voltage of the battery 300 is larger than the quick charge threshold voltage (for example, 4.35V), the charging control assembly 200 stops introducing direct current from the power adapter 100 to charge the battery 300 and feeds back the quick charge shutdown command to the main control circuit 107. Then, the main control circuit 107 will exit from the quick charge mode according to the quick charge shutdown command and returns to the regular charging mode.

FIG. 10 shows an example circuit diagram of a power adapter in the battery charging system provided by an embodiment of the present disclosure, and for illustration purposes, only parts related to embodiments of the present disclosure are shown, which will be described in details as follows.

The power circuit 106 includes: a first capacitor C1, a voltage stabilizing chip U1, a second capacitor C2, a first inductor L1, a second inductor L2, a first diode D1, a second diode D2, a third capacitor C3, a first resistor R1 and a second resistor R2.

A junction between a first terminal of the first capacitor C1 and both an input power pin Vin and an enable pin EN of the voltage stabilizing chip U1 is configured as the input terminal of the power circuit 106. A second terminal of the first capacitor C1 and a ground pin GND of the voltage stabilizing chip U1 are jointly grounded. A switch pin SW of the voltage stabilizing chip U1 and a first terminal of the second capacitor C2 are jointly coupled with a first terminal of the first inductor L1. An internal switch pin BOOTSTRAP of the voltage stabilizing chip U1 and a second terminal of the second capacitor C2 are jointly coupled with a cathode of the first diode D1. A feedback voltage pin FB of the voltage stabilizing chip U1 is coupled with a first terminal of the first resistor R1 and a first terminal of the second resistor R2, respectively. A second terminal of the first inductor L1 and a cathode of the second diode D2 are jointly coupled with a first terminal of the second inductor L2. A junction, formed by jointly connecting a second terminal of the second inductor L2 and an anode of the first diode D1, a second terminal of the first resistor R1 and a first terminal of the third capacitor C3, is configured as the output terminal of the power circuit 106. An anode of the second diode D2 and a second terminal of the second resistor R2 and a second terminal of the third capacitor C3 are jointly grounded. After using the voltage stabilizing chip U1 as a core to perform a voltage converting process on a voltage at the secondary terminal of the isolation transformer 103, the power circuit 106 outputs voltage of +3.3V to supply power for the main control circuit 107, the potential regulation circuit 108 and the current detection circuit 109. The voltage stabilizing chip U1 can be a Model MCP16301 buck-type DC/DC converter.

The main control circuit 107 includes: a main control chip U2, a third resistor R3, a reference voltage chip U3, a fourth resistor R4, a fifth resistor R5, a fourth capacitor C4, a sixth resistor R6, a seventh resistor R7, a first NMOS transistor Q1, an eighth resistor R8, a ninth resistor R9, a tenth resistor R10, an eleventh resistor R11, a twelfth resistor R12, a thirteenth resistor R13 and a fourteenth resistor R14.

A power pin VDD of the main control chip U2 is configured as the power terminal of the main control circuit 107. A ground pin VSS of the main control chip U2 is grounded. A first I/O pin RA0 of the main control chip U2 is suspended. A first terminal of the third resistor R3 is coupled with the power pin VDD of the main control chip U2. A second terminal of the third resistor R3 and a first terminal of the fourth resistor R4 are jointly coupled with a positive electrode CATHODE of the reference voltage chip U3. A negative electrode ANODE of the reference voltage chip U3 is grounded. A vacant pin NC of the reference voltage chip U3 is suspended. A second terminal of the fourth resistor R4 is coupled with a second I/O pin RA1 of the main control chip U2. A third I/O pin RA2 of the main control chip U2 is configured as the current detection terminal of the main control circuit 107. A fourth I/O pin RA3 of the main control chip U2 is coupled with a first terminal of the fifth resistor R5. A second terminal of the fifth resistor R5 and a first terminal of the fourth capacitor C4 are jointly coupled with the power pin VDD of the main control chip U2. A second terminal of the fourth capacitor C4 is grounded. A fifth I/O pin RA4 of the main control chip U2 is configured as the switch control terminal of the main control circuit 107. A sixth I/O pin RA5 of the main control chip U2 is coupled with a first terminal of the sixth resistor R6. A second terminal of the sixth resistor R6 and a grid electrode of the first NMOS transistor Q1 are jointly coupled with a first terminal of the seventh resistor R7. A second terminal of the seventh resistor R7 and a source electrode of the first NMOS transistor Q1 are jointly grounded. A drain electrode of the first NMOS transistor Q1 is coupled with a first terminal of the eighth resistor R8. A second terminal of the eighth resistor R8 is configured as the high-potential terminal of the main control circuit 107. A seventh I/O pin RC0 and an eighth I/O pin RC1 of the main control chip U2 are configured as the clock output terminal and the data output terminal of the main control circuit 107, respectively. A tenth I/O pin RC3 and a ninth I/O pin RC2 of the main control chip U2 are configured as the first voltage detection terminal and the second voltage detection terminal of the main control circuit 107, respectively. An eleventh I/O pin RC4 and a twelfth I/O pin RC5 of the main control chip U2 are coupled with a first terminal of the ninth resistor R9 and a first terminal of the tenth resistor R10, respectively. A first terminal of the eleventh resistor R11 and a first terminal of the twelfth resistor R12 are coupled with a second terminal of the ninth resistor R9 and a second terminal of the tenth resistor R10, respectively. A second terminal of the eleventh resistor R11 and a second terminal of the twelfth resistor R12 are jointly grounded. A first terminal of the thirteenth resistor R13 and a first terminal of the fourteenth resistor R14 are coupled with the second terminal of the ninth resistor R9 and the second terminal of the tenth resistor R10, respectively. A second terminal of the thirteenth resistor R13 and a second terminal of the fourteenth resistor R14 are jointly coupled with the power pin VDD of the main control chip U2. The second terminal of the ninth resistor R9 and the second terminal of the tenth resistor R10 are configured as the first communication terminal and the second communication terminal of the main control circuit 107, respectively. The main control chip U2 may be a microcontroller of PIC12LF1822, PIC12F1822, PIC16LF1823 or PIC16F1823 Model, the reference voltage chip U3, may be the Model LM4040 voltage reference device.

The potential regulation circuit 108 includes: A fifteenth resistor R15, a sixteenth resistor R16, a digital potentiometer U4, a seventeenth resistor R17, an eighteenth resistor R18, a fifth capacitor C5, a sixth capacitor C6 and a nineteenth resistor R19.

A junction of a first terminal of the fifteenth resistor R15 and a first terminal of the sixteenth resistor R16, a power pin VDD of the digital potentiometer U4 and a first terminal of the fifth capacitor C5 is configured as the power terminal of the potential regulation circuit 108. A second terminal of the fifth capacitor C5 and a first terminal of the sixth capacitor C6, a ground pin VSS of the digital potentiometer U4 and a first terminal of the seventeenth resistor R17 are jointly grounded. A second terminal of the sixth capacitor C6 is coupled with the power pin VDD of the digital potentiometer U4. A junction between a second terminal of the fifteenth resistor R15 and a serial data pin SDA of the digital potentiometer U4 is configured as the data input terminal of the potential regulation circuit 108. A junction between a second terminal of the sixteenth resistor R16 and a clock input pin SCL of the digital potentiometer U4 is configured as the clock input terminal of the potential regulation circuit 108. An address zero pin A0 of the digital potentiometer U4 is grounded. A first potential wiring pin P0A of the digital potentiometer U4 and a first terminal of the eighteenth resistor R18 are jointly coupled with a second terminal of the seventeenth resistor R17. A second terminal of the eighteenth resistor R18 and a second potential wiring pin P0B of the digital potentiometer U4 are jointly coupled with a first terminal of the nineteenth resistor R19. A second terminal of the nineteenth resistor R19 is configured as the high-potential terminal of the potential regulation circuit 108, and a potential tap pin POW of the digital potentiometer U4 is configured as the potential regulation terminal of the potential regulation circuit 108. The digital potentiometer U4 regulates an internal slide rheostat according to the clock signal and data signal output by the main control chip U2, changing the potential of the tap terminal of the internal slide rheostat, namely the potential tap pin POW of the digital potentiometer U4, so that the voltage tracking and controlling circuit 104 regulates the output voltage of the isolation transformer 103 with the potential change; the digital potentiometer U4 may be a MCP45X1 digital potentiometer.

The current detection circuit 109 includes: a twentieth resistor R20, a twenty-first resistor R21, a twenty-second resistor R22, a seventh capacitor C7, an eighth capacitor C8, a current detection chip U5, a twenty-third resistor R23, a ninth capacitor C9, a tenth capacitor C10 and a twenty-fourth resistor R24.

A first terminal and a second terminal of the twentieth resistor R20 are configured as the DC input terminal and the DC output terminal of the current detection circuit 109, respectively. A first terminal of the twenty-first resistor R21 and a first terminal of the twenty-second resistor R22 are coupled with the first terminal and the second terminal of the twentieth resistor R20, respectively. A second terminal of the twenty-first resistor R21 and a first terminal of the seventh capacitor C7 are jointly coupled with a positive input pin IN+ of the current detection chip U5. A second terminal of the twenty-second resistor R22 and a first terminal of the eighth capacitor C8 are jointly coupled with a negative input pin IN− of the current detection chip U5. A junction between a power pin V+ of the current detection chip U5 and a first terminal of the ninth capacitor C9 is configured as the power terminal of the current detection circuit 109. A vacant pin NC of the current detection chip U5 is suspended. An output pin OUT of the current detection chip U5 is coupled with a first terminal of the twenty-third resistor R23. A second terminal of the twenty-third resistor R23 is configured as the current-feedback terminal of the current detection circuit 109. A first terminal of the tenth capacitor C10 and a first terminal of the twenty-fourth resistor R24 are jointly coupled with the second terminal of the twenty-third resistor R23. A second terminal of the seventh capacitor C7, a second terminal of the eighth capacitor C8, and a second terminal of the ninth capacitor C9, a second terminal of the tenth capacitor C10, a second terminal of the twenty-fourth resistor R24, and a ground pin GND, a first reference voltage pin REF1 and a second reference voltage pin REF2 of the current detection chip U5 are jointly grounded. The twentieth resistor R20 used as a current detection resistor samples the output current of the output filter circuit 104, namely the output current of the power adapter 100, then the current detection chip U5 outputs a current detection signal according to the voltage on both ends of the twentieth resistor R20 to the main control chip U2. The current detection chip U5 may be an INA286 Model current shunt monitor.

The voltage detection circuit 110 includes: a twenty-fifth resistor 25, a twenty-sixth resistor R26, an eleventh capacitor C11, a twelfth capacitor C12, a twenty-seventh resistor R27 and a twenty-eighth resistor R28.

A first terminal of the twenty-fifth resistor R25 is configured as the first detection terminal of the voltage detection circuit 110. A junction between a second terminal of the twenty-fifth resistor R25 and both a first terminal of the twenty-sixth resistor R26 and a first terminal of the eleventh capacitor C11 is configured as the second output terminal of the voltage detection circuit 110. A second terminal of the twenty-sixth resistor R26 is configured as the second detection terminal of the voltage detection circuit 110. A second terminal of the eleventh capacitor C11 and both a first terminal of the twelfth capacitor C12 and a first terminal of the twenty-seventh resistor R27 are jointly coupled with the second terminal of the twenty-sixth resistor R26. A junction between a second terminal of the twelfth capacitor C12 and both a second terminal of the twenty-seventh resistor R27 and a first terminal of the twenty-eighth resistor R28 is configured as the first output terminal of the voltage detection circuit 110. A second terminal of the twenty-eighth resistor R28 is configured as the third detection terminal of the voltage detection circuit 110.

The output switch circuit 111 includes: a twenty-ninth resistor R29, a thirtieth resistor R30, a thirteenth capacitor C13, a thirty-first resistor R31, a first NPN-type triode N1, a thirty-second resistor R32, a second NPN-type triode N2, a third diode D3, a voltage stabilizing diode ZD, a thirty-third resistor R33, a thirty-fourth resistor R34, a thirty-fifth resistor R35, a second NMOS transistor Q2 and a third NMOS transistor Q3.

A first terminal of the twenty-ninth resistor R29 is configured as the controlled terminal of the output switch circuit 111. A second terminal of the twenty-ninth resistor R29 and a first terminal of the thirtieth resistor R30 are jointly coupled with a base electrode of the first NPN-type triode N1. A first terminal of the thirteenth capacitor C13 and a first terminal of the thirty-first resistor R31, a first terminal of the thirty-second resistor R32 are jointly coupled with a cathode of the third diode D3. An anode of the third diode D3 is configured as the power terminal of the output switch circuit 111. A second terminal of the thirty-first resistor R31 and a base electrode of the second NPN-type triode N2 are jointly coupled with a collector electrode of the first NPN-type triode N1. A second terminal of the thirty-second resistor R32, a cathode of the voltage stabilizing diode ZD and a first terminal of the thirty-third resistor R33 are jointly coupled with a collector electrode of the second NPN-type triode N2. A second terminal of the thirtieth resistor R30, a second terminal of the thirteenth capacitor C13, an emitter electrode of the first NPN-type triode N1, an emitter electrode of the second NPN-type triode N2 and an anode of the voltage stabilizing diode ZD are jointly grounded. A second terminal of the thirty-third resistor R33 and a first terminal of the thirty-fourth resistor R34, a first terminal of the thirty-fifth resistor R35, a grid electrode of the second NMOS transistor Q2 and a grid electrode of the third NMOS transistor Q3 are jointly coupled. A second terminal of the thirty-fourth resistor R34 is configured as the ground terminal of the output switch circuit 111. A drain electrode of the second NMOS transistor Q2 is configured as the input terminal of the output switch circuit 111. A source electrode of the second NMOS transistor Q2 and a second terminal of the thirty-fifth resistor R35 are jointly coupled with a source electrode of the third NMOS transistor Q3. A drain electrode of the third NMOS transistor Q3 is configured as the output terminal of the output switch circuit 111. The second NMOS transistor Q2 and the third NMOS transistor Q3 are switched on or off simultaneously to turn on or off the DC output of the power adapter 100.

Figure 11:
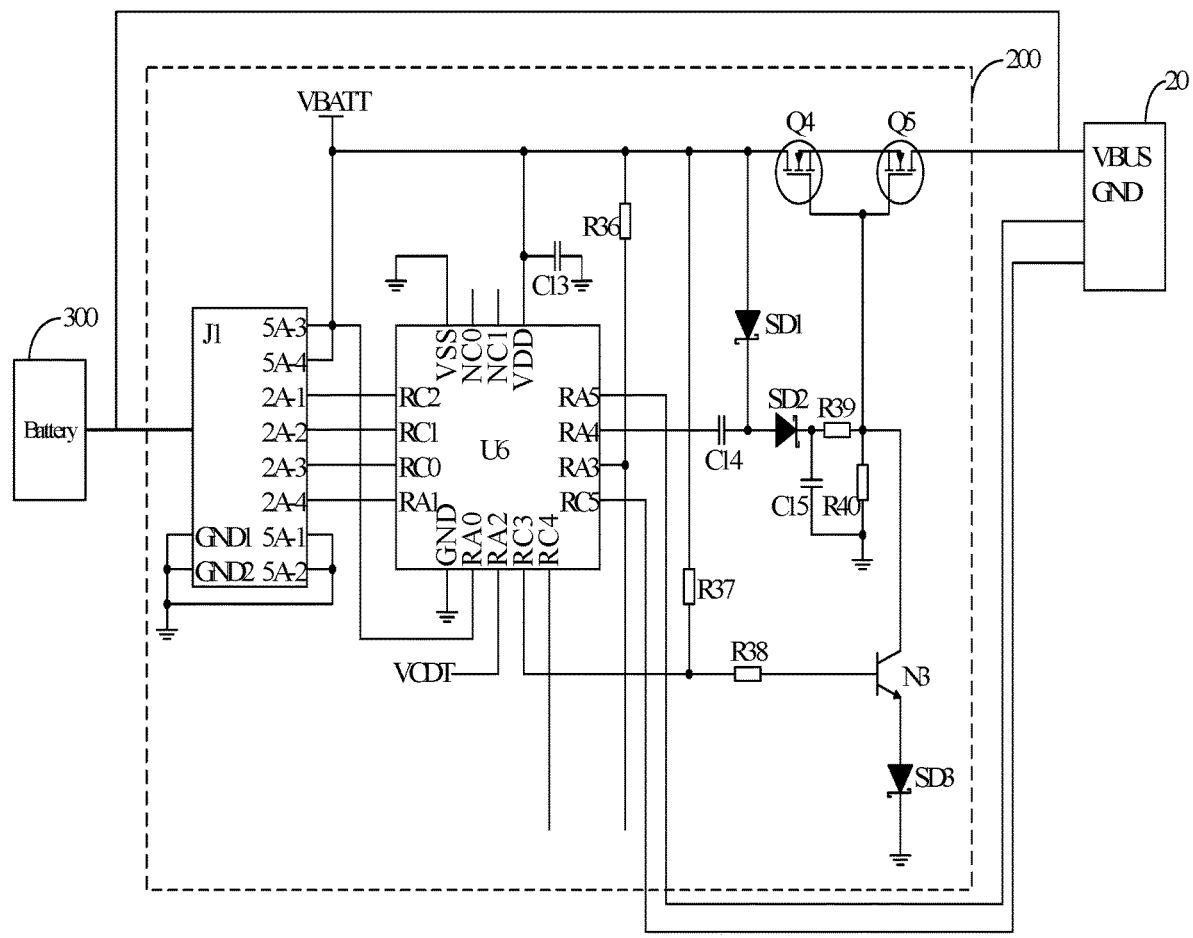
FIG. 11 is an example circuit diagram of a charging control assembly in an electronic equipment.

FIG. 11 shows an example circuit diagram of a charging control assembly in the electronic equipment provided by an embodiment of the present disclosure, and for illustration purposes, only parts related to embodiments of the present disclosure are shown, which will be described in details as follows.

The charging control assembly 200 includes: a battery connector J1, a main controller U6, a thirteenth capacitor C13, a thirty-sixth resistor R36, a thirty-seventh resistor R37, a fourteenth capacitor C14, a first Schottky diode SD1, a second Schottky diode SD2, a third Schottky diode SD3, a fifteenth capacitor C15, a thirty-eighth resistor R38, a thirty-ninth resistor R39, a fortieth resistor R40, a third NPN-type triode N3, a fourth NMOS transistor Q4 and a fifth NMOS transistor Q5.

The battery connector J1 is coupled with electrodes of the battery 300. A first pin 5A-1 and a second pin 5A-2 of the battery connector J1 are jointly grounded. A first ground pin GND1 and a second ground pin GND2 of the battery connector J1 are jointly grounded. A first I/O pin RA0 of the main controller U6 is coupled with a seventh pin 5A-3 and an eighth pin 5A-4 of the battery connector J1 respectively. A second I/O pin RA1, a seventh I/O pin RC0, an eighth I/O pin RC1 and a ninth I/O pin RC2 of the main controller U6 are coupled with a sixth pin 2A-4, a fifth pin 2A-3, a fourth pin 2A-2, a third pin 2A-1 of the battery connector J1, respectively. Both an analog ground pin VSS and a ground pin GND of the main controller U6 are grounded. Both a first vacant pin NC0 and a second vacant pin NC1 of the main controller U6 are suspended. Both a power pin VDD of the main controller U6 and a first terminal of the thirteenth capacitor C13 are jointly coupled with the seventh pin 5A-3 and the eighth pin 5A-4 of the battery connector J1. A fourth I/O pin RA3 and an eleventh I/O pin RC4 of the main controller U6 carry out data communications with the electronic equipment. The thirty-sixth resistor R36 is coupled between the fourth I/O pin RA3 and the power pin VDD of the main controller U6. A sixth I/O pin RA5 and a twelfth I/O pin RC5 of the main controller U6 are coupled with the first communication terminal and the second communication terminal of the main control circuit 107 in the power adapter 100, respectively. A first terminal of the thirty-seventh resistor R37 and a first terminal of the thirty-eighth resistor R38 are jointly coupled with a tenth I/O terminal RC3 of the main controller U6. A second terminal of the thirty-seventh resistor R37 is coupled with the power pin VDD of the main controller U6. A second terminal of the thirty-eighth resistor R38 is coupled with a base electrode of the third NPN-type triode N3. A fifth I/O terminal RA4 of the main controller U6 is coupled with a first terminal of the fourteenth capacitor C14. A second terminal of the fourteenth capacitor C14 and a cathode of the first Schottky diode SD1 are jointly coupled with an anode of the second Schottky diode SD2. A first terminal of the thirty-ninth resistor R39 and a first terminal of the fifteenth capacitor C15 are jointly coupled with a cathode of the second Schottky diode SD2. Each of a second terminal of the thirty-ninth resistor R39, a first terminal of the fortieth resistor R40 and a collector electrode of the third NPN-type triode N3 is coupled with a grid electrode of the fourth NMOS transistor Q4 and a grid electrode of the fifth NMOS transistor Q5. A second terminal of the fortieth resistor R40 and a second terminal of the fifteenth capacitor C15 are jointly grounded. A source electrode of the fourth NMOS transistor Q4 is coupled with an anode of the first Schottky diode SD1, and further coupled with the seventh pin 5A-3 and the eighth pin 5A-4 of the battery connector J1. A drain electrode of the fourth NMOS transistor Q4 is coupled with a drain electrode of the fifth NMOS transistor Q5. A source electrode of the fifth NMOS transistor Q5 is coupled with a power wire VBUS of the communication interface 10 of the power adapter 100. An emitter electrode of the third NPN-type triode N3 is coupled with an anode of the third Schottky diode SD3. A cathode of the third Schottky diode SD3 is grounded. The main controller U6 may be a microcontroller of PIC12LF1501, PIC12F1501, PIC16LF1503, PIC16F1503, PIC16LF1507, PIC16F1507, PIC16LF1508, PIC16F1508, PIC16LF1509 or PIC16F1509 Model.

When the power adapter 100 operates at the quick charge mode, the charging control assembly 200 introduces direct current from the power adapter 100 to charge the battery 300 as follows, the main controller U6 outputs a control signal via the fifth I/O pin RA4 thereof to control the turn-on of the fourth NMOS transistor Q4 and the fifth transistor Q5, and controls the turn-off of the third NPN-type triode N3 via the tenth I/O pin RC3 thereof, thus introducing direct current from the communication interface 10 of the power adapter 100 to charge the battery 300, since the battery 300 itself has obtained direct current from the power adapter 100, the direct current introduced by the charging control assembly 200 may play a part in the increasing of charging current for battery 300, thus realizing a quick charge for battery 300; conversely, when the battery 300 needs to be regularly charged, the main controller U6 outputs low level through the fifth I/O pin RA4 thereof to control the turn-off of the fourth NMOS transistor Q4 and the fifth NMOS transistor Q5, and outputs high level through the tenth I/O pin RC3 thereof to control the turn-on of the third NPN-type transistor N3.

The main controller U6 performs data communication via the fourth I/O pin RA3 and eleventh I/O pin RC4 thereof with the electronic equipment, when the power supply member of the electronic equipment is the battery 300, in an embodiment, the main controller U6 may transmit voltage and electricity quantity information of the battery 300 to the electronic equipment (such as mobile phones), and also the main controller U6 may judge based on the voltage of the battery 300 whether the battery 300 has completed the quick charge process, if yes, a quick charge shutdown command may be fed back to the electronic equipment to instruct the electronic equipment to switch the quick charge mode to the regular charging mode; during the power adapter 100 charging the battery 300, if the power adapter 100 is decoupled from the battery 300 suddenly, the main controller U6 detects, via the battery connector J1, the voltage of the battery 300 and feeds back a charging termination instruction to the electronic equipment to instruct the electronic equipment to terminate the charging process for the battery 300; in addition, if the electronic equipment may detect the temperature of the battery 300, and instruct the main controller U6 at an abnormal temperature to turn off the fourth NMOS transistor Q4 and the fifth NMOS transistor Q5, to stop the quick charge for the battery 300, meanwhile the electronic equipment switches the quick charge mode to the regular charging mode.

In addition, when the power adapter 100 operates at a quick charge mode and the charging control assembly 200 introduces direct current from the power adapter 100 to charge the battery 300, if the power wire VBUS and the ground wire GND of the communication interface 10 of the power adapter 100 are reversely coupled with the power wire VBUS and ground wire GND of communication interface 20 of the electronic equipment (that is the power wire VBUS and ground wire GND of communication interface 10 of the power adapter 100 are respectively coupled with the ground wire of the charging control assembly 200 and the source electrode of the fifth NMOS transistor Q5), direct current will be introduced from the ground wire of the charging control assembly 200, and the source electrode of the fifth NMOS transistor Q5 is coupled with ground.

Figure 12:
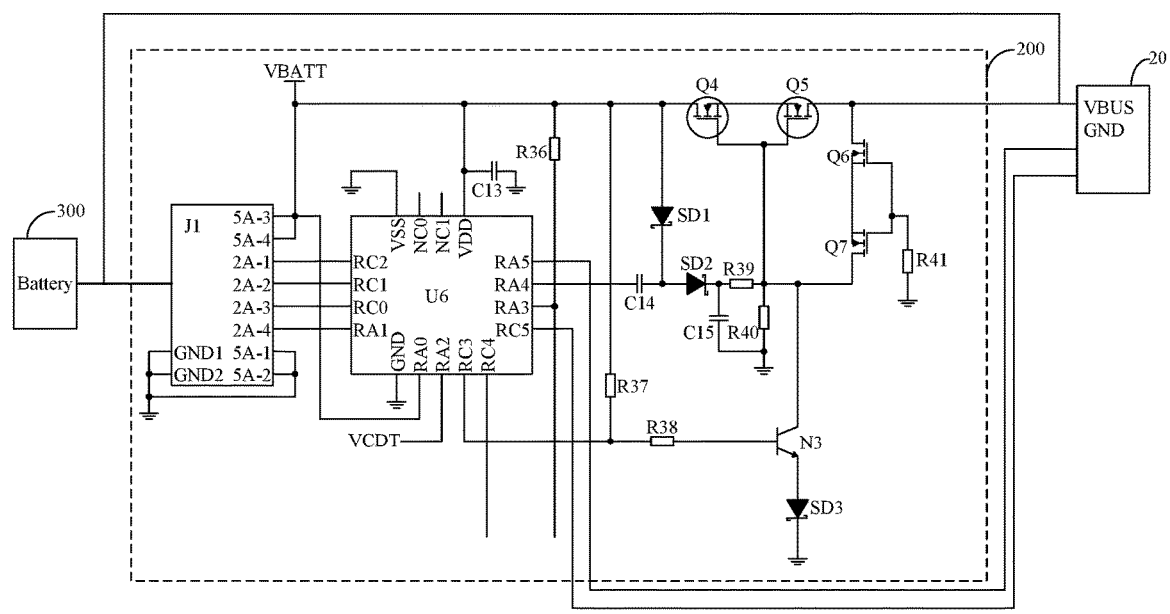
FIG. 12 is another example circuit diagram of a charging control assembly in an electronic equipment.

As shown in FIG. 12, to avoid damage to components, the charging control assembly 200 further includes a sixth NMOS transistor Q6, a seventh NMOS transistor Q7 and a forty-first resistor R41. A source electrode of the sixth NMOS transistor Q6 is coupled with the source electrode of the fifth NMOS transistor Q5, a drain electrode of the sixth NMOS transistor Q6 is coupled with a drain electrode of the seventh NMOS transistor Q7, a source electrode of the seventh NMOS transistor Q7 is coupled with the collector electrode of the third NPN-type triode N3, grid electrodes of both the sixth NMOS transistor Q6 and the seventh NMOS transistor Q7 are coupled with a first terminal of the forty-first resistor R41, and a second terminal of the forty-first resistor R41 is grounded.

When the above reversal coupling fault occurs, direct current is introduced into the second terminal of the forty-first resistor R41 from the ground to drive the turn-off of the sixth NMOS transistor Q6 and the seventh NMOS transistor Q7, so that the direct current from the ground into the charging control assembly 200 cannot form a loop, thus preventing the components in the charging control assembly 200 from being damaged.

In conclusion, the embodiments of the present disclosure adopts a battery charging system which includes a power adapter 100 and a charging control assembly 200; during charging the battery 300, the power adapter 100 first charges the battery in a regular charging mode; when the output current value of the power adapter is within the regular current range for the predefined time period, the power adapter performs the quick charge inquiry communication with the charging control assembly; after the charging control assembly sends a quick charge command to the power adapter, the power adapter adjusts the output voltage according to the battery voltage information fed back by the charging control assembly; if such output voltage meets the quick charge voltage requirement predefined in the charging control assembly, the power adapter adjusts the output current and output voltage according to the quick charge mode so as to charge the battery, and the charging control assembly simultaneously introduces direct current from the power adapter to charge the battery, thus realizing a quick charge for battery to reduce the charging time.

The above descriptions are merely preferred embodiments of the disclosure, and not intended to limit the disclosure; any modifications, equivalent substitutions and improvements made within the spirit and principles of the disclosure shall fall in the protection scope of the disclosure.

What is claimed is:

1. A battery charging apparatus, wherein
the battery charging apparatus comprises a power adapter and a charging control assembly, the power adapter charges a battery of an electronic equipment via a communication interface of the power adapter, the charging control assembly is arranged in the electronic equipment, both the charging control assembly and the battery are coupled with the communication interface of the power adapter via a communication interface of the electronic equipment, the charging control assembly is also coupled with electrodes of the battery so as to detect a voltage of the battery, and the communication interface of the electronic equipment is a USB interface;

during charging the battery, the power adapter is configured to:

first charge the battery in a regular charging mode; when an output current value of the power adapter falls within a regular current range for a predefined time period, perform a quick charge inquiry communication with the charging control assembly; determining whether the output current value of the power adapter falls within the regular current range for the predefined time period in response to not receiving a quick charge command sent by the charging control assembly via the USB interface; after receiving the quick charge command sent by the charging control assembly via the USB interface when the voltage of the battery reaches the quick charge voltage value, adjust an output voltage according to battery voltage information fed back by the charging control assembly via the USB interface, the quick charge command being configured to instruct the power adapter to enter into a quick charge mode; when the output voltage meets a quick charge voltage requirement predefined in the charging control assembly, adjust an output current and the output voltage according to the quick charge mode so as to charge the battery, in which the charging control assembly simultaneously introduces direct current from the power adapter to charge the battery.

2. The battery charging apparatus of claim 1, wherein,
the power adapter comprises an EMI filter circuit, a high-voltage rectifier and filter circuit, an isolation transformer, an output filter circuit and a voltage tracking and controlling circuit; after EMI of mains electricity is filtered by the EMI filter circuit, the high-voltage rectifier and filter circuit conducts a rectifying and filtering process to output a high-voltage direct current, after passing through the isolation transformer for an electrical isolation, the high-voltage direct current is outputted to the output filter circuit for being filtered and used to charge the battery, and the voltage tracking and controlling circuit adjusts an output voltage of the isolation transformer according to an output voltage of the output filter circuit;

the power adapter further comprises a power circuit, a main control circuit, a potential regulation circuit, a current detection circuit, a voltage detection circuit and an output switch circuit;

an input terminal of the power circuit is coupled with a secondary terminal of the isolation transformer; a power terminal of the main control circuit, a power terminal of the potential regulation circuit and a power terminal of the current detection circuit are jointly coupled with an output terminal of the power circuit; both a high-potential terminal of the main control circuit and a high-potential terminal of the potential regulation circuit are coupled with a positive output terminal of the output filter circuit; a potential regulation terminal of the potential regulation circuit is coupled with the voltage tracking and controlling circuit; a DC input terminal of the current detection circuit is coupled with the positive output terminal of the output filter circuit, a current-feedback terminal of the current detection circuit is coupled with a current detection terminal of the main control circuit; a clock output terminal is coupled with a clock input terminal of the potential regulation circuit and a data output terminal of the main control circuit is coupled with a data input terminal of the potential regulation circuit; a first detection terminal and a second detection terminal of the voltage detection circuit are coupled with a DC output terminal of the current detection circuit and a negative output terminal of the output filter circuit, respectively; a first output terminal and a second output terminal of the voltage detection circuit are coupled with a first voltage detection terminal and a second voltage detection terminal of the main control circuit, respectively; an input terminal of the output switch circuit is coupled with the DC output terminal of the current detection circuit; an output terminal of the output switch circuit is coupled with a third detection terminal of the voltage detection circuit; a ground terminal of the output switch circuit is coupled with the negative output terminal of the output filter circuit, a controlled terminal and a power terminal of the output switch circuit are coupled with a switch control terminal of the main control circuit and the secondary terminal of the isolation transformer, respectively; and the negative output terminal of the output filter circuit, the output terminal of the output switch circuit, a first communication terminal and a second communication terminal of the main control circuit are all coupled with the communication interface of the power adapter;

when the power adapter first charges the battery in the regular charging mode, the main control circuit controls the output switch circuit to turn off a DC output of the power adapter; the voltage detection circuit detects the output voltage of the power adapter and feeds back a voltage detection signal to the main control circuit; according to the voltage detection signal, the main control circuit judges whether the output voltage of the power adapter is greater than a voltage threshold; if yes, the main control circuit continues to judge the output voltage of the power adapter; if not, the main control circuit controls the output switch circuit to turn on the DC output of the power adapter, and drives the voltage tracking and controlling circuit through the potential regulation circuit to set the output voltage of the isolation transformer as a regular output voltage; the current detection circuit detects the output current of the power adapter and feeds back a current detection signal to the main control circuit; if the main control circuit judges according to the current detection signal that the output current of the power adapter is within the regular current range for the predefined time period, the main control circuit sends the quick charge inquiry instruction to the charging control assembly; after receiving the quick charge command sent by the charging control assembly, the main control circuit drives, according to the battery voltage information fed back by the charging control assembly and through the potential regulation circuit, the voltage tracking and controlling circuit to adjust the output voltage of the isolation transformer; if the output voltage of the power adapter meets the quick charge voltage requirement predefined by the charging control assembly, then through the potential regulation circuit, the main control circuit drives the voltage tracking and controlling circuit to adjust the output voltage of the isolation transformer so as to enable the power adapter to output the direct current on the basis of a quick charge output current and a quick charge output voltage, and the charging control assembly simultaneously introduces the direct current from the power adapter for charging the battery.

3. The battery charging apparatus of claim 2, wherein, the power circuit comprises a first capacitor, a voltage stabilizing chip, a second capacitor, a first inductor, a second inductor, a first diode, a second diode, a third capacitor, a first resistor and a second resistor;

a junction between a first terminal of the first capacitor and both an input power pin and an enable pin of the voltage stabilizing chip is configured as the input terminal of the power circuit; a second terminal of the first capacitor and a ground pin of the voltage stabilizing chip are jointly grounded; a switch pin of the voltage stabilizing chip and a first terminal of the second capacitor are jointly coupled with a first terminal of the first inductor; an internal switch pin of the voltage stabilizing chip and a second terminal of the second capacitor are jointly coupled with a cathode of the first diode; a feedback voltage pin of the voltage stabilizing chip is coupled with a first terminal of the first resistor and a first terminal of the second resistor, respectively; a second terminal of the first inductor and a cathode of the second diode are jointly coupled with a first terminal of the second inductor; a junction, formed by jointly connecting a second terminal of the second inductor, an anode of the first diode, a second terminal of the first resistor and a first terminal of the third capacitor, is configured as the output terminal of the power circuit; an anode of the second diode, a second terminal of the second resistor and a second terminal of the third capacitor are jointly grounded.

4. The battery charging apparatus of claim 2, wherein, the main control circuit comprises a main control chip, a third resistor, a reference voltage chip, a fourth resistor, a fifth resistor, a fourth capacitor, a sixth resistor, a seventh resistor, a first NMOS transistor, an eighth resistor, a ninth resistor, a tenth resistor, an eleventh resistor, a twelfth resistor, a thirteenth resistor and a fourteenth resistor;

a power pin of the main control chip is configured as the power terminal of the main control circuit; a ground pin of the main control chip is grounded; a first I/O pin of the main control chip is suspended; a first terminal of the third resistor is coupled with the power pin of the main control chip; a second terminal of the third resistor and a first terminal of the fourth resistor are jointly coupled with a positive electrode of the reference voltage chip; a negative electrode of the reference voltage chip is grounded; a vacant pin of the reference voltage chip U3 is suspended; a second terminal of the fourth resistor is coupled with a second I/O pin of the main control chip; a third I/O pin of the main control chip is configured as the current detection terminal of the main control circuit; a fourth I/O pin of the main control chip is coupled with a first terminal of the fifth resistor; a second terminal of the fifth resistor and a first terminal of the fourth capacitor are jointly coupled with the power pin of the main control chip; a second terminal of the fourth capacitor is grounded; a fifth I/O pin of the main control chip is configured as the switch control terminal of the main control circuit; a sixth I/O pin of the main control chip is coupled with a first terminal of the sixth resistor; a second terminal of the sixth resistor and a grid electrode of the first NMOS transistor are jointly coupled with a first terminal of the seventh resistor; a second terminal of the seventh resistor and a source electrode of the first NMOS transistor are jointly grounded; a drain electrode of the first NMOS transistor is coupled with a first terminal of the eighth resistor; a second terminal of the eighth resistor is configured as the high-potential terminal of the main control circuit; a seventh I/O pin and an eighth I/O pin of the main control chip are configured as the clock output terminal and the data output terminal of the main control circuit, respectively; a tenth I/O pin and a ninth I/O pin of the main control chip are configured as the first voltage detection terminal and the second voltage detection terminal of the main control circuit, respectively; an eleventh I/O pin and a twelfth I/O pin of the main control chip are coupled with a first terminal of the ninth resistor and a first terminal of the tenth resistor, respectively; a first terminal of the eleventh resistor and a first terminal of the twelfth resistor are coupled with a second terminal of the ninth resistor and a second terminal of the tenth resistor, respectively; a second terminal of the eleventh resistor and a second terminal of the twelfth resistor are jointly grounded; a first terminal of the thirteenth resistor and a first terminal of the fourteenth resistor are coupled with the second terminal of the ninth resistor and the second terminal of the tenth resistor, respectively; a second terminal of the thirteenth resistor and a second terminal of the fourteenth resistor are jointly coupled with the power pin of the main control chip;

the second terminal of the ninth resistor and the second terminal of the tenth resistor are configured as the first communication terminal and the second communication terminal of the main control circuit, respectively.

5. The battery charging apparatus of claim 2, wherein, the potential regulation circuit comprises a fifteenth resistor, a sixteenth resistor, a digital potentiometer, a seventeenth resistor, an eighteenth resistor, a fifth capacitor, a sixth capacitor and a nineteenth resistor;

a junction of a first terminal of the fifteenth resistor, a first terminal of the sixteenth resistor, a power pin of the digital potentiometer and a first terminal of the fifth capacitor is configured as the power terminal of the potential regulation circuit; a second terminal of the fifth capacitor, a first terminal of the sixth capacitor, a ground pin of the digital potentiometer and a first terminal of the seventeenth resistor are jointly grounded; a second terminal of the sixth capacitor is coupled with the power pin of the digital potentiometer; a junction between a second terminal of the fifteenth resistor and a serial data pin of the digital potentiometer is configured as the data input terminal of the potential regulation circuit; a junction between a second terminal of the sixteenth resistor and a clock input pin of the digital potentiometer is configured as the clock input terminal of the potential regulation circuit; an address zero pin of the digital potentiometer is grounded; a first potential wiring pin of the digital potentiometer and a first terminal of the eighteenth resistor are jointly coupled with a second terminal of the seventeenth resistor; a second terminal of the eighteenth resistor and a second potential wiring pin of the digital potentiometer are jointly coupled with a first terminal of the nineteenth resistor; a second terminal of the nineteenth resistor is configured as the high-potential terminal of the potential regulation circuit; a potential tap pin of the digital potentiometer is configured as the potential regulation terminal of the potential regulation circuit.

6. The battery charging apparatus of claim 2, wherein, the current detection circuit comprises a twentieth resistor, a twenty-first resistor, a twenty-second resistor, a seventh capacitor, an eighth capacitor, a current detection chip, a twenty-third resistor, a ninth capacitor, a tenth capacitor and a twenty-fourth resistor;

a first terminal and a second terminal of the twentieth resistor are configured as the DC input terminal and the DC output terminal of the current detection circuit, respectively; a first terminal of the twenty-first resistor and a first terminal of the twenty-second resistor are coupled with the first terminal and the second terminal of the twentieth resistor, respectively; a second terminal of the twenty-first resistor and a first terminal of the seventh capacitor are jointly coupled with a positive input pin of the current detection chip, a second terminal of the twenty-second resistor and a first terminal of the eighth capacitor are jointly coupled with a negative input pin of the current detection chip; a junction between a power pin of the current detection chip and a first terminal of the ninth capacitor is configured as the power terminal of the current detection circuit; a vacant pin of the current detection chip is suspended; an output pin of the current detection chip is coupled with a first terminal of the twenty-third resistor; a second terminal of the twenty-third resistor is configured as the current-feedback terminal of the current detection circuit; a first terminal of the tenth capacitor and a first terminal of the twenty-fourth resistor are jointly coupled with the second terminal of the twenty-third resistor; a second terminal of the seventh capacitor and a second terminal of the eighth capacitor, a second terminal of the ninth capacitor, a second terminal of the tenth capacitor, a second terminal of the twenty-fourth resistor, and a ground pin, a first reference voltage pin and a second reference voltage pin of the current detection chip are jointly grounded.

7. The battery charging apparatus of claim 2, wherein, the voltage detection circuit comprises a twenty-fifth resistor, a twenty-sixth resistor, an eleventh capacitor, a twelfth capacitor, a twenty-seventh resistor and a twenty-eighth resistor;

a first terminal of the twenty-fifth resistor is configured as the first detection terminal of the voltage detection circuit; a junction between a second terminal of the twenty-fifth resistor and both a first terminal of the twenty-sixth resistor and a first terminal of the eleventh capacitor is configured as the second output terminal of the voltage detection circuit; a second terminal of the twenty-sixth resistor is configured as the second detection terminal of the voltage detection circuit; a second terminal of the eleventh capacitor and both a first terminal of the twelfth capacitor and a first terminal of the twenty-seventh resistor are jointly coupled with the second terminal of the twenty-sixth resistor; a junction between a second terminal of the twelfth capacitor and both a second terminal of the twenty-seventh resistor and a first terminal of the twenty-eighth resistor is configured as the first output terminal of the voltage detection circuit; a second terminal of the twenty-eighth resistor is configured as the third detection terminal of the voltage detection circuit.

8. The battery charging apparatus of claim 2, wherein, the output switch circuit comprises a twenty-ninth resistor, a thirtieth resistor, a thirteenth capacitor, a thirty-first resistor, a first NPN-type triode, a thirty-second resistor, a second NPN-type triode, a third diode, a voltage stabilizing diode, a thirty-third resistor, a thirty-fourth resistor, a thirty-fifth resistor, a second NMOS transistor and a third NMOS transistor;

a first terminal of the twenty-ninth resistor is configured as the controlled terminal of the output switch circuit; a second terminal of the twenty-ninth resistor and a first terminal of the thirtieth resistor are jointly coupled with a base electrode of the first NPN-type triode; a first terminal of the thirteenth capacitor, a first terminal of the thirty-first resistor and a first terminal of the thirty-second resistor are jointly coupled with a cathode of the third diode; an anode of the third diode is configured as the power terminal of the output switch circuit; a second terminal of the thirty-first resistor and a base electrode of the second NPN-type triode are jointly coupled with a collector electrode of the first NPN-type triode; a second terminal of the thirty-second resistor, a cathode of the voltage stabilizing diode and a first terminal of the thirty-third resistor are jointly coupled with a collector electrode of the second NPN-type triode; a second terminal of the thirtieth resistor, a second terminal of the thirteenth capacitor, an emitter electrode of the first NPN-type triode, an emitter electrode of the second NPN-type triode and an anode of the voltage stabilizing diode are jointly grounded; a second terminal of the thirty-third resistor, a first terminal of the thirty-fourth resistor, a first terminal of the thirty-fifth resistor, a grid electrode of the second NMOS transistor and a grid electrode of the third NMOS transistor are jointly coupled; a second terminal of the thirty-fourth resistor is configured as the ground terminal of the output switch circuit; a drain electrode of the second NMOS transistor is configured as the input terminal of the output switch circuit; a source electrode of the second NMOS transistor and a second terminal of the thirty-fifth resistor are jointly coupled with a source electrode the third NMOS transistor; a drain electrode of the third NMOS transistor is configured as the output terminal of the output switch circuit.

9. The battery charging apparatus of claim 1, wherein, the charging control assembly comprises a battery connector, a main controller, a thirteenth capacitor, a thirty-sixth resistor, a thirty-seventh resistor, a fourteenth capacitor, a first Schottky diode, a second Schottky diode, a third Schottky diode, a fifteenth capacitor, a thirty-eighth resistor, a thirty-ninth resistor, a fortieth resistor, a third NPN-type triode, a fourth NMOS transistor and a fifth NMOS transistor;

the battery connector is coupled with the electrodes of the battery; a first pin and a second pin of the battery connector are jointly grounded; a first ground pin and a second ground pin of the battery connector are jointly grounded; a first I/O pin of the main controller is coupled with a seventh pin and an eighth pin of the battery connector respectively; a second I/O pin, a seventh I/O pin, an eighth I/O pin and a ninth I/O pin of the main controller are coupled with a sixth pin, a fifth pin, a fourth pin, a third pin of the battery connector, respectively; both an analog ground pin and a ground pin of the main controller are grounded; both a first vacant pin and a second vacant pin of the main controller are suspended; both a power pin of the main controller and a first terminal of the thirteenth capacitor are jointly coupled with the seventh pin and the eighth pin of the battery connector; a fourth I/O pin and an eleventh I/O pin of the main controller carry out data communications with the electronic equipment; the thirty-sixth resistor is coupled between the fourth I/O pin and the power pin of the main controller; a sixth I/O pin and a twelfth I/O pin of the main controller are coupled with the first communication terminal and the second communication terminal of the main control circuit in the power adapter, respectively; a first terminal of the thirty-seventh resistor and a first terminal of the thirty-eighth resistor are jointly coupled with a tenth I/O terminal of the main controller; a second terminal of the thirty-seventh resistor is coupled with the power pin of the main controller; a second terminal of the thirty-eighth resistor is coupled with a base electrode of the third NPN-type triode; a fifth I/O terminal of the main controller is coupled with a first terminal of the fourteenth capacitor; a second terminal of the fourteenth capacitor and a cathode of the first Schottky diode are jointly coupled with an anode of the second Schottky diode; a first terminal of the thirty-ninth resistor and a first terminal of the fifteenth capacitor are jointly coupled with a cathode of the second Schottky diode; each of a second terminal of the thirty-ninth resistor, a first terminal of the fortieth resistor and a collector electrode of the third NPN-type triode is coupled with a grid electrode of the fourth NMOS transistor and a grid electrode of the fifth NMOS transistor; a second terminal of the fortieth resistor and a second terminal of the fifteenth capacitor are jointly grounded; a source electrode of the fourth NMOS transistor is coupled with an anode of the first Schottky diode, and further coupled with the seventh pin and the eighth pin of the battery connector; a drain electrode of the fourth NMOS transistor is coupled with a drain electrode of the fifth NMOS transistor; a source electrode of the fifth NMOS transistor is coupled with a power wire of the communication interface of the power adapter; an emitter electrode of the third NPN-type triode is coupled with an anode of the third Schottky diode; a cathode of the third Schottky diode is grounded.

10. The battery charging apparatus of claim 9, wherein, the charging control assembly further comprises a sixth NMOS transistor, a seventh NMOS transistor and a forty-first resistor; a source electrode of the sixth NMOS transistor is coupled with the source electrode of the fifth NMOS transistor; a drain electrode of the sixth NMOS transistor is coupled with a drain electrode of the seventh NMOS electrode; a source electrode of the seventh NMOS transistor is coupled with the collector electrode of the third NPN-type triode; a grid electrode of the sixth NMOS transistor and a grid electrode of the seventh NMOS transistor are jointly coupled with a first terminal of the forty-first resistor; a second terminal of the forty-first resistor is grounded.

11. A battery charging method, comprising:
during charging a battery, first charging, by a power adapter, the battery in a regular charging mode;
when an output current value of the power adapter is within a regular current range for a predefined time period, performing, by the power adapter, a quick charge inquiry communication with the charging control assembly;
determining whether the output current value of the power adapter falls within the regular current range for the predefined time period in response to not receiving a quick charge command sent by the charging control assembly via the USB interface; after receiving a quick charge command sent by the charging control assembly via a USB interface when the voltage of the battery reaches a quick charge voltage value, adjusting, by the power adapter, an output voltage according to battery voltage information fed back by the charging control assembly via the USB interface, the quick charge command being configured to instruct the power adapter to enter into a quick charge mode;
when the output voltage meets a quick charge voltage requirement predefined in the charging control assembly, adjusting, by the power adapter, an output current and the output voltage according to the quick charge mode so as to charge the battery, and simultaneously introducing, by the charging control assembly, a direct current from the power adapter to charge the battery.

12. The battery charging method of claim 11, further comprising:
detecting and judging, by the power adapter, the output current thereof;
if the output current value of the power adapter is less than a lower limit of current, returning to carry out the act of detecting and judging by the power adapter the output current thereof;
if the output current value of the power adapter is greater than an upper limit of current, turning off, by the power adapter, a DC output.

13. The battery charging method of claim 11, further comprising:
performing, by the power adapter, a quick charge voltage inquiry communication with the charging control assembly, and feeding back, by the power adapter, output voltage information to the charging control assembly;

judging, by the charging control assembly according to the output voltage information, whether the output voltage of the power adapter meets the quick charge voltage requirement.

14. The battery charging method of claim 13, further comprising:

if the output voltage of the power adapter does not meet the quick charge voltage requirement, sending, by the charging control assembly, a voltage deviation feedback signal to the power adapter;

adjusting, by the power adapter, the output voltage thereof according to the voltage deviation feedback signal, and returning to carry out the act of judging by the charging control assembly according to the output voltage information whether the output voltage of the power adapter meets the quick charge voltage requirement.

15. The battery charging method of claim 11, further comprising:

detecting, by the charging control assembly, a voltage of the battery and judging, by the charging control assembly, whether the voltage of the battery is greater than a quick charge threshold voltage;

if the voltage of the battery is greater than a quick charge threshold voltage, stopping, by the charging control assembly, introducing the direct current from the power adapter to charge the battery, and feeding back, by the charging control assembly, a quick charge shutdown command to the power adapter; exiting from the quick charge mode by the power adapter according to the quick charge shutdown command, and returning to carry out the act of charging the battery by the power adapter in the regular charging mode;

if the voltage of the battery is not greater than a quick charge threshold voltage, returning to carry out the act of adjusting by the power adapter an output current and the output voltage according to a quick charge mode so as to charge the battery.

16. The battery charging method of claim 11, wherein, adjusting by the power adapter an output current and the output voltage according to a quick charge mode so as to charge the battery comprises:

sending, by the power adapter, a first electrical parameter access request to the charging control assembly, and sending, by the charging control assembly, a second electrical parameter access request to the power adapter;

feeding back, by the charging control assembly, input voltage information and input current information of the electronic equipment to the power adapter according to the first electrical parameter access request;

feeding back, by the power adapter, output voltage information and output current information of the power adapter to the charging control assembly according to the second electrical parameter access request;

judging, by the power adapter according to the input voltage information, whether a difference between an input voltage of the electronic equipment and the output voltage of the power adapter is greater than an abnormal voltage difference threshold, and judging, by the power adapter according to the input current information, whether a difference between input current of the electronic equipment and the output current of the power adapter is greater than an abnormal current difference;

if the power adapter determines that the difference between the input voltage of the electronic equipment and the output voltage of the power adapter is greater than the abnormal voltage difference threshold and/or that the difference between the input current of the electronic equipment and the output current of the power adapter is greater than the abnormal current difference, sending, by the power adapter, a first charging shutdown instruction to the charging control assembly, and automatically turning off, by the power adapter, the DC output, and instructing, by the charging control assembly according to the first charging shutdown instruction, the electronic equipment to turn off a communication interface thereof;

if the power adapter determines that the difference between the input voltage of the electronic equipment and the output voltage of the power adapter is not greater than the abnormal voltage difference threshold and that the difference between the input current of the electronic equipment and the output current of the power adapter is not greater than the abnormal current difference, judging, by the charging control assembly according to the output voltage information, whether the difference between the input voltage of the electronic equipment and the output voltage of the power adapter is greater than the abnormal voltage difference threshold, and judging, by the charging control assembly according to the output current information, whether the difference between the input current of the electronic equipment and the output current of the power adapter is greater than the abnormal current difference;

if the charging control assembly determines that the difference between the input voltage of the electronic equipment and the output voltage of the power adapter is greater than the abnormal voltage difference threshold and/or that the difference between the input current of the electronic equipment and the output current of the power adapter is greater than the abnormal current difference, sending by the charging control assembly a second charging shutdown instruction to the power adapter, and instructing by the charging control assembly the electronic equipment to turn off the communication interface thereof and turning off by the power adapter the DC output according to the second charging shutdown instruction;

if the charging control assembly determines that the difference between the input voltage of the electronic equipment and the output voltage of the power adapter is not greater than the abnormal voltage difference threshold and that the difference between the input current of the electronic equipment and the output current of the power adapter is not greater than the abnormal current difference, returning to carry out the act of sending by the power adapter a first electrical parameter access request to the charging control assembly and sending by the charging control assembly a second electrical parameter access request to the power adapter.

17. The battery charging method of claim 11, wherein, charging by the power adapter the battery in the regular charging mode comprises:

under a circumstance that the DC output is turned off, detecting and judging, by the power adapter, whether a voltage of the communication interface is greater than a voltage threshold;

if the power adapter determines that the voltage of the communication interface is greater than the voltage threshold, continuing to carry out the act of detecting and judging by the power adapter whether a voltage of the communication interface is greater than a voltage threshold; and if the power adapter determines that the voltage of the communication interface is not greater than the voltage threshold, outputting by the power adapter the direct current according to a predefined regular output voltage.

18. The battery charging method of claim 11, wherein, performing by the power adapter the quick charge inquiry communication with the charging control assembly comprises:

sending, by the power adapter, a quick charge inquiry instruction to the charging control assembly;

judging, by the charging control assembly according to the quick charge inquiry instruction, whether the voltage of the battery reaches a quick charge voltage value;

if the voltage of the battery reaches the quick charge voltage value, feeding back by the charging control assembly the quick charge command to the power adapter; and if the voltage of the battery does not reach the quick charge voltage value, feeding back by the charging control assembly a quick charge rejection command to the power adapter.

19. The battery charging method of claim 11, wherein, adjusting by the power adapter the output voltage according to the battery voltage information fed back by the charging control assembly comprises:

sending, by the power adapter, a battery voltage access request to the charging control assembly according to the quick charge command sent from the charging control assembly;

feeding back, by the charging control assembly, the battery voltage information to the power adapter according to the battery voltage access request;

adjusting, by the power adapter, the output voltage thereof to a setting value of a quick charge voltage according to the battery voltage information.

20. The battery charging method of claim 11, wherein, adjusting by the power adapter the output current and the output voltage according to the quick charge mode so as to charge the battery comprises:

feeding back, by the charging control assembly, an entry instruction of the quick charge mode to the power adapter;

adjusting, by the power adapter, the output current and the output voltage thereof according to the entry instruction of the quick charge mode to a quick charge output current and a quick charge output voltage, respectively;

sending, by the power adapter, a battery voltage access request to the charging control assembly;

feeding back, by the charging control assembly, the battery voltage information to the power adapter according to the battery voltage access request;

judging, by the power adapter according to the battery voltage information, whether a difference between the output voltage of the power adapter and the voltage of the battery is greater than a voltage difference threshold;

if the difference between the output voltage of the power adapter and the voltage of the battery is greater than the voltage difference threshold, turning off by the power adapter the DC output; and if the difference between the output voltage of the power adapter and the voltage of the battery is not greater than the voltage difference threshold, adjusting by the power adapter according to the battery voltage information the output current thereof and returning to carry out the act of sending by the power adapter a battery voltage access request to the charging control assembly.

* * * * *